United States Patent [19]
Jensen et al.

[11] Patent Number: 5,360,330
[45] Date of Patent: * Nov. 1, 1994

[54] RF HEATED MOLD FOR THERMOPLASTIC MATERIALS

[75] Inventors: Joseph C. Jensen, Tucson; Junius E. Taylor, Phoenix, both of Ariz.

[73] Assignee: Engineering & Research Associates, Inc., Tucson, Ariz.

[*] Notice: The portion of the term of this patent subsequent to Nov. 3, 2009 has been disclaimed.

[21] Appl. No.: 830,368

[22] Filed: Jan. 31, 1992

[51] Int. Cl.$^5$ ............................................. B29C 65/02
[52] U.S. Cl. .................................... 425/144; 249/78; 264/25; 264/40.6; 264/327; 425/170; 425/174.4; 425/378.1; 425/384
[58] Field of Search ............... 249/78; 264/25, 40.6, 264/319, 327, 345; 425/144, 170, 174, 174.4, 182, 191, 192 R, 143, 378.1, 384, DIG. 13

[56] References Cited

U.S. PATENT DOCUMENTS

| | | | |
|---|---|---|---|
| 2,814,070 | 11/1957 | Bulkley et al. | 425/144 |
| 2,832,879 | 4/1958 | Van Riper | 425/144 |
| 2,904,839 | 9/1959 | Beckwith | 425/144 |
| 3,068,513 | 12/1962 | Chaffin | 425/378.1 |
| 3,843,300 | 10/1974 | McFarlane | 425/384 |
| 4,055,219 | 10/1977 | Orlandi et al. | 425/384 |
| 4,253,011 | 2/1981 | Hinz | 425/144 |
| 4,661,300 | 4/1987 | Daugherty | 425/144 |
| 5,047,605 | 9/1991 | Ogden | 264/25 |
| 5,102,324 | 4/1992 | Bullard et al. | 24/40.6 |
| 5,160,396 | 11/1992 | Jensen et al. | 249/78 |

Primary Examiner—Charles S. Bushey
Attorney, Agent, or Firm—Cahill, Sutton & Thomas

[57] ABSTRACT

A source of radio frequency energy is applied to a low thermal inertia heating element with high thermal conductivity, such as a spool, for rapidly heating the heating element to settable predetermined temperature, which temperature is maintained essentially constant. The heating element is detachably attached about the die of a mold for transferring heat to the die to form, mold, weld or extrude thermoplastic material placed within the mold. Thermal chokes restrict heat transfer from the die to the remainder of the mold. One or more heat sinks draws and dissipates heat from the thermal chokes to maintain cool zones of the mold. Following the heating cycle, upon termination of application of radio frequency energy to the spool, cooling may be accelerated by directing a stream of gas upon the heating element.

28 Claims, 16 Drawing Sheets

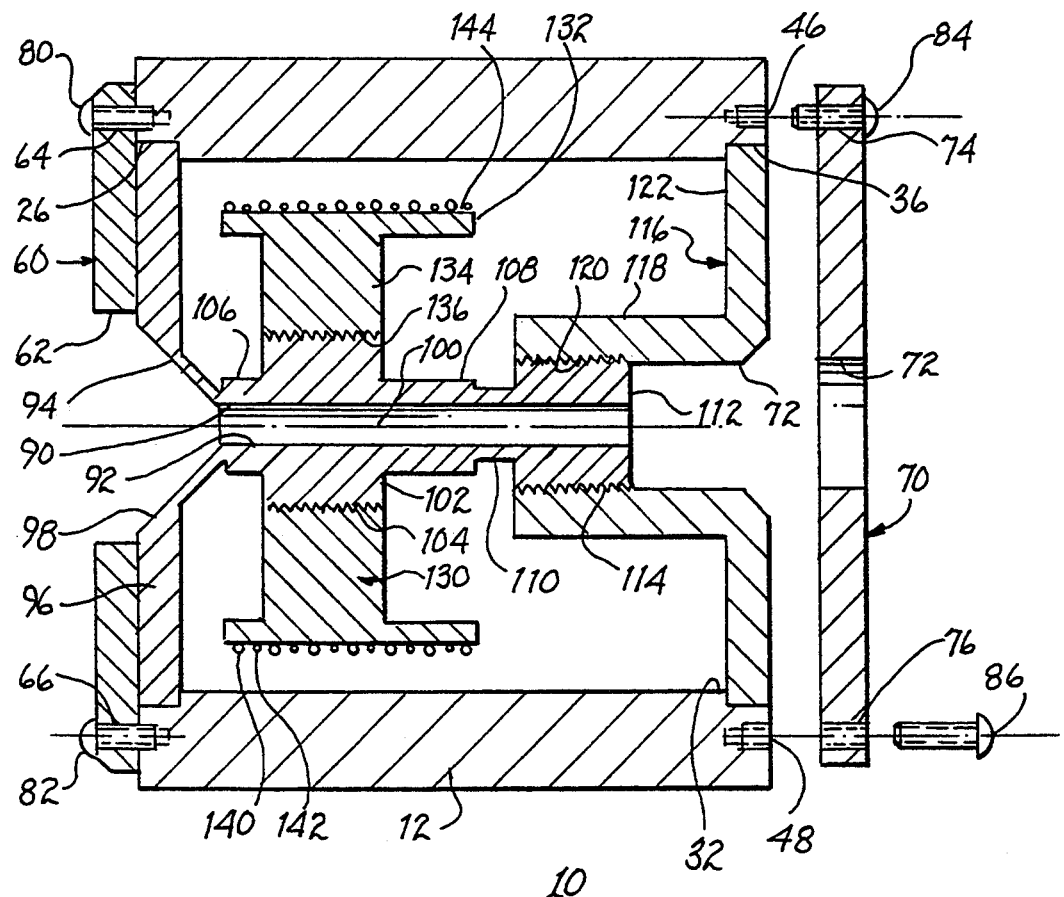
fig.1
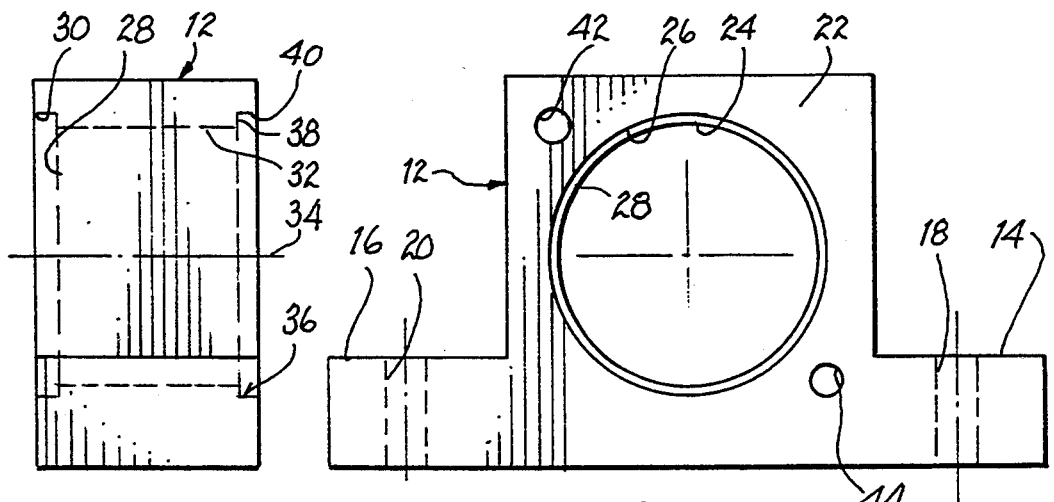
fig.3
fig.2

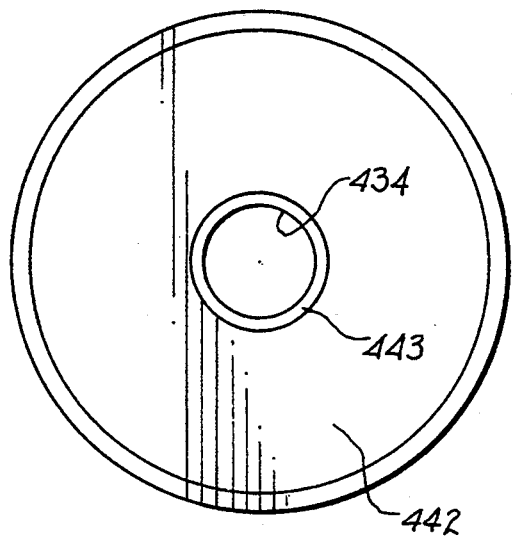
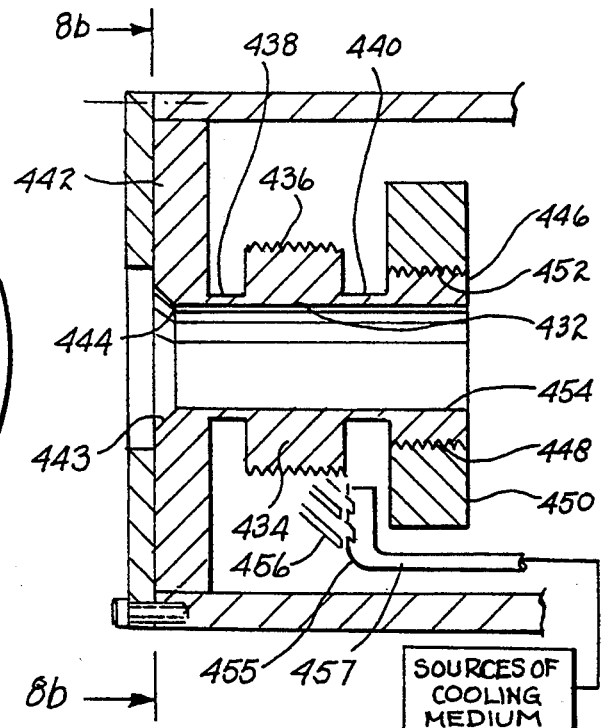
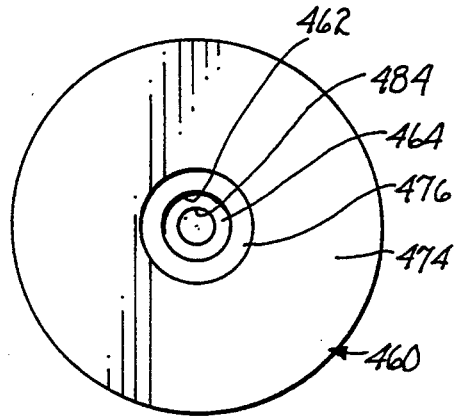
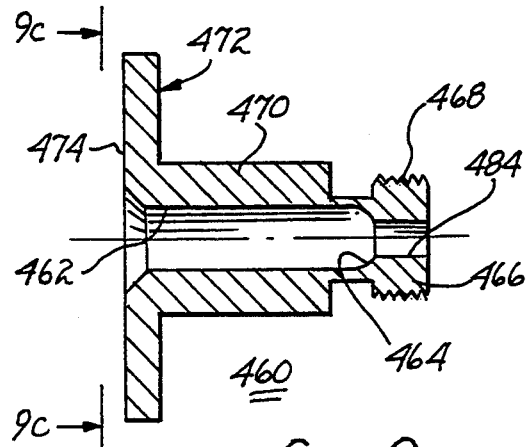
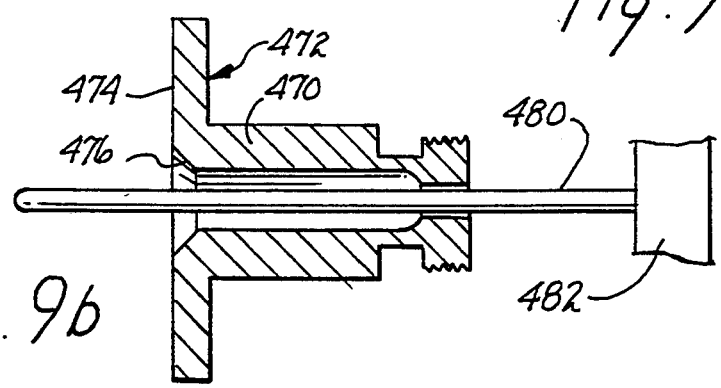

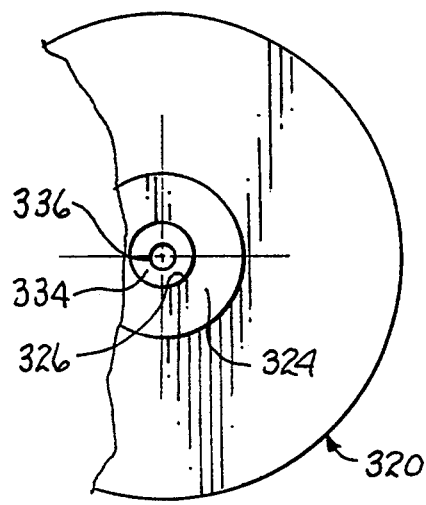
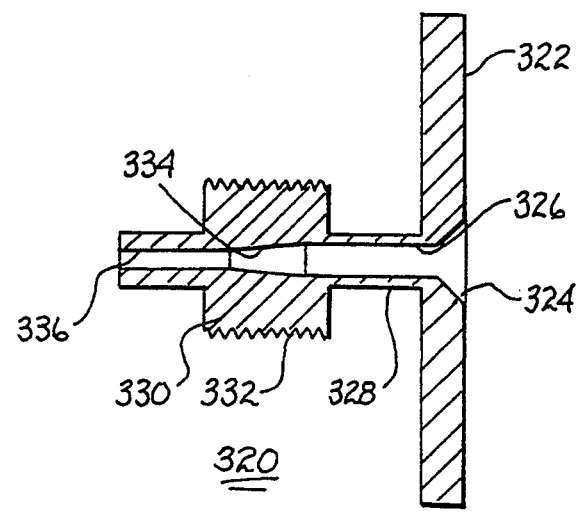
fig. 15b    fig. 15a
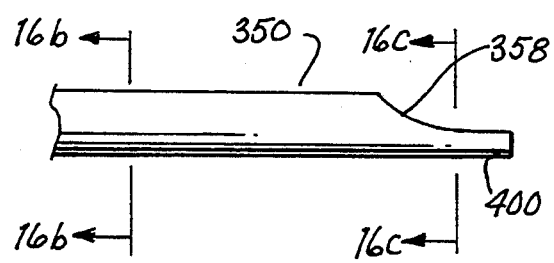
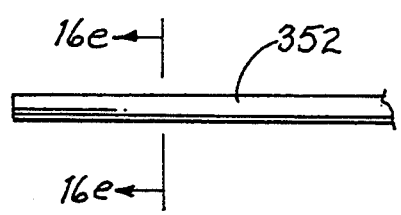
fig. 16a    fig. 16d
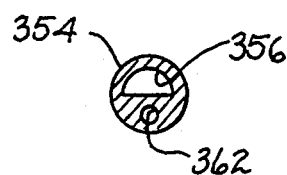
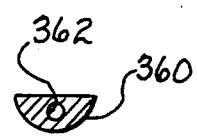
fig. 16b    fig. 16c    fig. 16e

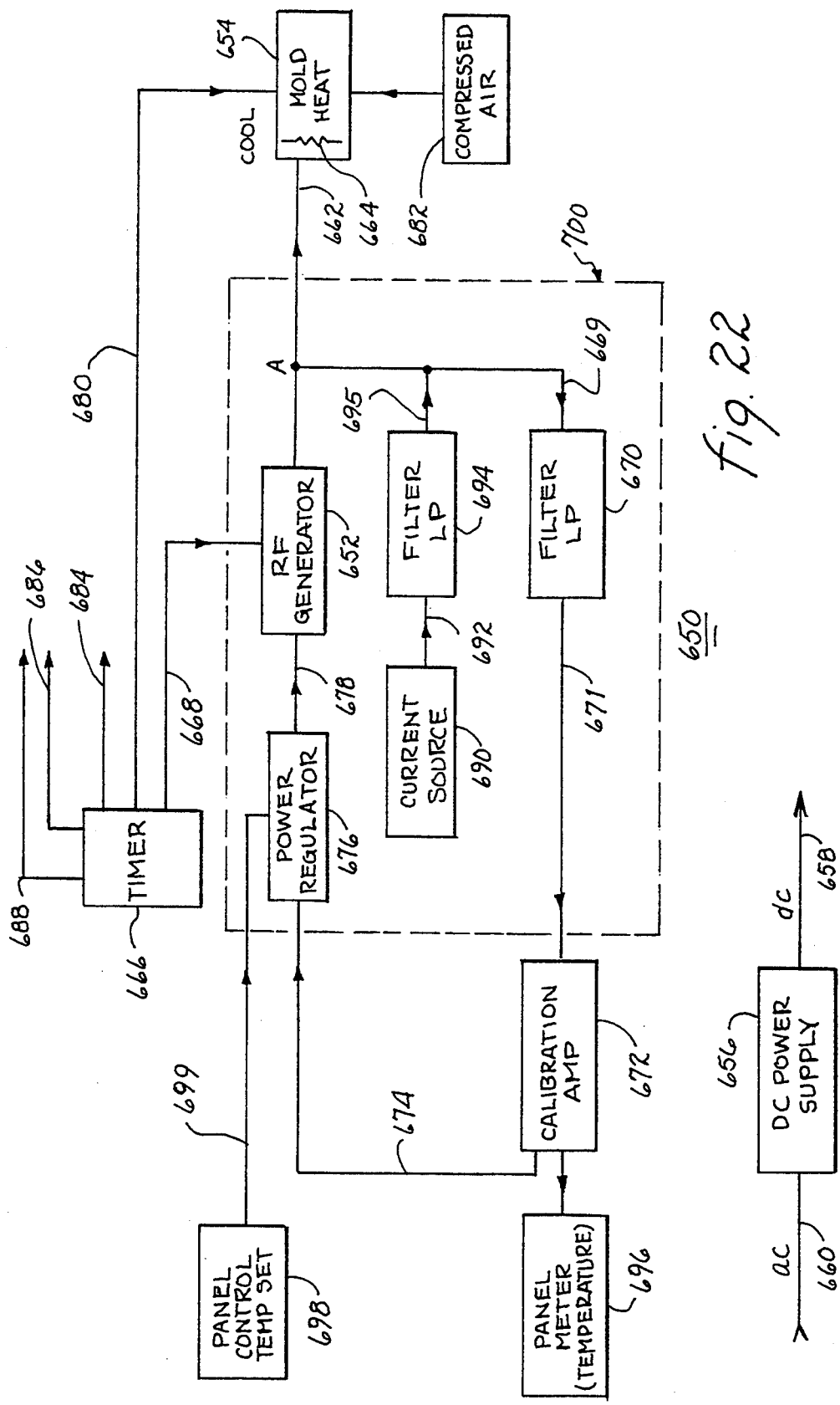

RF HEATED MOLD FOR THERMOPLASTIC MATERIALS

CROSS REFERENCE TO RELATED APPLICATION

This application is related to a patent applicant entitled "RF Energized and Temperature Monitored and Managed Catheter Mounted Probe" filed Apr. 14, 1989, Ser. No. 337,903 (abandoned) and its continuation application, also now abandoned, entitled "RF Energized and Temperature Monitored and Managed Catheter Mounted Probe" filed Jul. 1, 1991, Ser. No. 724,107 copending with the present application and assigned to the present assignee.

BACKGROUND OF THE INVENTION

1. Field of the Invention

The present invention relates to temperature controlled heated molds for thermoplastic materials and, more particularly, to radio frequency heated molds for forming, molding, welding or extruding thermoplastic materials and circuits therefor.

2. Background of the Invention

In the field of catheters formed of flexible plastic tubing and used in angioplasty and other procedures, the tips and assembly joints have to be smoothed to enhance medical procedures and to minimize a likelihood of injury to human tissue. Such smoothing has been accomplished by mechanical or chemical milling or reforming the tips. Alternatively, application of heat from an open flame or other heat source has been used to slightly melt and thereby re-contour the tips. To attach two lengths of tubing end to end, chemical bonding is often used. Alternatively, a source of heat may be applied to the junction of thermoplastic tubing to cause melting and welding of the ends of the tubing; typically, such a junction has discontinuities on the interior and the exterior surfaces. Annular attachment of one length of tubing with a cylindrical segment is usually performed through chemical welding or bonding because of difficulties associated in application of a controlled amount of heat to effect welding. Similarly, balloons of the type used in angioplasty procedures are usually chemically welded to a length of tubing having one or more lumen.

While a weld formed chemically usually meets the requisite structural criteria, various problems are associated therewith. In particular, residue of the chemical must be removed. When such chemical is present interior of tubing, extra care in removing it must be taken. The chemical welding process does not always provide smooth weld joints. Furthermore, during assembly the chemicals are usually toxic and create health hazards to production workers. When any of various conventional heat sources are used to effect welding, control of the heat applied is generally difficult. The lack of precise control of temperature of the location of the temperature of the heat applied may result in weak or partial welds. Alternatively, thin or weak spots may develop due to flow of thermoplastic material if too much heat is applied.

Whether prior art processes employ chemicals or conventional heat sources, several problems are present. First, a substantial amount of time must be expended by a technician to form, bond or weld the thermoplastic material. Second, such time expenditure creates a substantial increase in cost of manufacture. Third, integrity of the procedure is not always assured with potential hazardous consequences during an angioplasty procedure. Fourth, such questionable integrity mandates extensive quality control procedures which are expensive and result in poor manufacturing needs. Fifth, lack of consistent uniformity renders each product unique and therefore not commensurate with the consistent quality of large scale production and use requirements of medical products.

SUMMARY OF THE INVENTION

A mold, for forming, melting, welding or extruding thermoplastic material, includes a heat zone commensurate with the function to be performed. Thermal chokes inhibit heat transfer to adjacent parts of the mold and one or more heat sinks draw and dissipate heat adjacent the heat zone to effect rapid cooling. A source of air or other gas under pressure is discharged upon the heat zone to effect rapid cooling upon completion of the heat function. A spool, disengageably engaged with the heat zone is of high thermal conductivity and low thermal capacity to rapidly transfer heat by conduction to the heat zone. A coil, thermally responsive to radio frequency energy, is wrapped about the spool. The coil is thermally conductively connected to the spool to provide rapid and effective heat transfer therebetween. The coil is electrically connected to a source of radio frequency energy, which source provides energy as a function of a desired presettable temperature of the coil to control the amount of heat generated and the temperature of the heat zone. The coil may be of a single wire which, in cooperation with associated circuits, provides both a heating function and a control function; alternatively, the coil may include two wires, one for heating and one for sensing the temperature to provide a signal for controlling the amount of heat applied. Depending upon the nature of the plastic thermoforming procedure and desired shape of the plastic to be formed, a removable mandrel or other forming elements at ambient temperature may be associated with the mold heat zone to control the configuration of the plastic material.

It is therefore a primary object of the present invention to provide apparatus using radio frequency energized mold to weld, melt, form or extrude thermoplastic material.

Another object of the present invention is to provide a detachably attached heating element for use with a mold for thermoplastic material.

Yet another object of the present invention is to provide interchangeable radio frequency energized heating elements useable with a custom mold that are for similar or different temperatures.

Still another object of the present invention is to provide a low thermal capacity heating element and a mold, which heating element is energizable by a source of radio frequency energy to provide heat at a predetermined temperature for a predetermined duration.

A further object of the present invention is to provide rapid heat transfer and dissipation of heat from a heated element of a mold to prevent prior or subsequent distortion of a thermoplastic material formed, welded, melted or extruded by the mold.

A yet further object of the present invention is to provide directionally channeled heat flow in a mold from a coil energized by a radio frequency energy source.

A still further object of the present invention is to provide a method for forming, welding, melting or extruding thermoplastic elements.

A still further object of the present invention is to provide an electrical circuit utilizing either a single wire or a pair of wires to heat to a predetermined temperature a heating element associated with a mold for forming, welding, melting or extruding materials.

These and other objects of the present invention will become apparent to those skilled in the art as the description therein proceeds.

DESCRIPTION OF THE DRAWINGS

FIG. 1 is a cross-sectional view of a representative mold assembly;

FIG. 2 is a front view of the housing for the mold assembly;

FIG. 3 is a partial side view of the housing;

FIGS. 8a and 8b illustrate a cross-sectional view and a front view of a mold for butt welding thermoplastic tubing;

FIGS. 9a, 9b and 9c illustrate a cross-sectional view of a mold for finishing the end of tubing, a mandrel used with the mold and a front view of the mold, respectively;

FIGS. 15a and 15b illustrate a cross-sectional and a frontal view of a mold for an intravenous catheter;

FIGS. 16a–16e illustrate two catheters to be joined and their respective cross-sectional areas;

FIGS. 21a and 21b illustrate schematics drawings of the circuit shown in FIG. 20a;

FIG. 22 illustrates a circuit in block diagram form of a high power single wire system for heating and for temperature managing the heating element of a mold and FIG. 22a illustrates a representative power supply for such circuit;

DESCRIPTION OF THE PREFERRED EMBODIMENT

Figure 4:
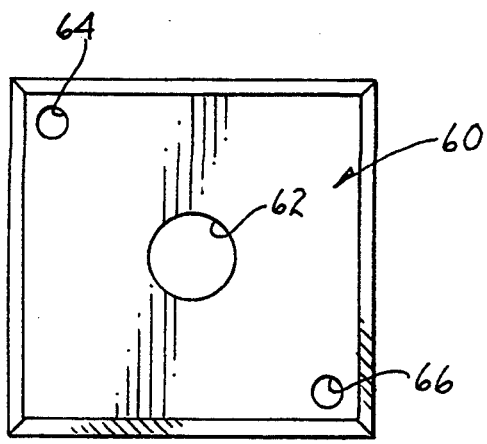
FIG. 4 is a front view of a typical mounting plate for the housing.

Referring to FIG. 1, there is illustrated a cross-section view of a typical and representative mold assembly 10. The mold assembly includes a housing 12, as shown in further detail in FIGS. 2 and 3. The housing includes a pair of mounting flanges 14,16 having one or more bores 18,20, respectively, for receiving mounting bolts or the like to secure the housing to a plate or the like. Front wall 22 of housing 12 includes an aperture 24. The aperture is partially circumscribed by an annular depression 26 defined by shoulder 28 and cylindrical wall 30. An aperture 32 is disposed in rear wall 34. An annular depression 36, defined by shoulder 38 and cylindrical wall 40 encircles aperture 32. A pair of opposed threaded cavities 42,44 are disposed in opposed relationship with respect to aperture 24 in front wall 22. Similar threaded cavities 46,48 are disposed in rear wall 34. A mounting plate 60, which may be of the type shown in FIG. 4, includes a central aperture 62 and a pair of bores 64,66 positionally coincident with threaded cavities 42,44 in front wall 22 of housing 12. Mounting plate 70, which may be equivalent to or identical with mounting plate 60 shown in FIG. 4, includes a central aperture 72. The aperture in either or both mounting plates may include a bevel. A pair of bores 74,76 are formed in mounting plate 70 positionally coincident with threaded cavities 46,48 disposed in rear wall 34 of the housing. Machine screws 80,82 may be used to secure mounting plate 60 to front wall 22. Similar machine screws 84,86 may be used to secure mounting plate 70 to rear wall 34.

Referring to FIG. 1, there is shown a mold 90, which may be of different configurations, as discussed below. Depending upon its configuration, it may be used to form, weld, melt or extrude thermoplastic material. The mold includes a heatable heat zone or center section 92 which actually heats the thermoplastic material. A thin wall cone 94 extends anteriorly of the center section and supports a radially extending apertured disc 96. As indicated, the interior radial perimeter of the disc may define a truncated cone 98 as an extension of thin walled cone 94. Disc 96 is substantially thicker with respect to the wall thickness of thin wall cone 94 and it serves as a heat sink. The disc is positioned within annular depression 26 of housing 12 and retained therein by mounting plate 60. In this manner, mold 90 is supported within housing 12. A mold cavity 100 is disposed within center section 92 and is configured commensurate with the thermoforming procedure to be undertaken. In mold 90, the mold cavity or die is illustrated a constant diameter cylindrical bore. Center section 92 includes an annular abutment 102 having threads 104 disposed about its cylindrical surface. An annular ridge 106 extends anteriorly to interconnect thin wall cone 94 with abutment 102. A further annular ridge 108 extends posteriorly of abutment 102. The combination of annular abutment 102 and annular ridges 106,108 constitute the heat zone of center section 92. A thin wall cylinder 110 extends posteriorly from annular ridge 108. A further annular abutment 112 is disposed posteriorly of cylinder 110 and includes threads 114 disposed about its cylindrical surface. A heat sink 116 includes a hollow boss 118 having threads 120 and an apertured disc 122. Threads 120 of boss 118 engage threads 114 of annular abutment 112 to permit threaded interconnection and support with mold 90. Disc 122 may be supported solely by mold 90 or it may nest within annular depression 36 formed in housing 12; mounting plate 70, may be secured to the housing to retain disc 122 in place. From the above description, it will be appreciated that heat sink 96 at the anterior end of mold 90 can be retained within housing 12 by mounting plate 60 and the posterior end of the mold can be retained by mounting plate 70 securing heat sink 116 in place.

A heating element 130 includes a sleeve 132 having an apertured diaphragm 134 extending radially inwardly therefrom. The inner surface of the diaphragm includes threads 136 for threadedly engaging threads 104 of annular abutment 102. Because of its configuration, the heating element may be referred to as a spool. A pair of wires 140,142 are wrapped about the exterior surface 144 of sleeve 132. Preferably, these wires are not twisted and define a two element helix. Wire 140 is a control wire which has a large thermal coefficient of resistance; thereby, its value of electrical resistance increases as a function of its temperature. By applying a constant voltage to the control wire and measuring a change in voltage due to the change in resistance, a correlation with the temperature of the wire can be made. Wire 142 is a heating wire and has a very low thermal coefficient of resistivity; thus, its value of electrical resistance will stay essentially constant despite a temperature excursion. Thus, wire 142 is used to heat heating element 130 and wire 140 is used to sense the temperature of the heating element. Associated circuitry senses a change in resistance of control wire 140 and regulates the amount of RF energy applied to heating wire 142 and thereby controls the amount of heating performed by the heating wire.

Heating element 130 is preferably of low thermal inertia or low thermal capacitance material to accelerate heat transfer by conduction within the heating element. Furthermore, such characteristic minimizes temperature gradients within the heating element. The heat from the heating element is transferred by conduction via threads 104 and 136 to center section 92 of mold 90. Center section 92 will heat relatively rapidly by conduction. Anterior and posterior annular abutments 106,108, being of lesser annular thickness and therefore of lesser mass will also heat up at essentially the same rate and to the same temperature as annular abutment 102. Thin wall cone 94 serves in the manner of a thermal choke to minimize transfer of heat anteriorly from annular ridge 106. Disc 96 will rapidly draw heat from thin wall cone 94 due to its substantially greater mass and maintain the thin wall cone relatively cool; furthermore, heat from disc 96 will be transferred to both mounting plate 60 bearing thereagainst and to front wall 22 of housing 22 via annular depression 26. Similarly, thin wall cylinder 110 will serve as a thermal choke to prevent heat transfer posteriorly from center section 92. Whatever heat is transferred through thin wall cylinder 110 is transferred to annular abutment 112. Heat sink 116, being connected to annular abutment 112 through threads 114,120, will rapidly draw heat from the annular abutment due to the substantial difference in mass between the heat sink and the annular abutment. As will be described in further detail below, a blast of cool air or chilled gas may be directed at and about the heating element and the center section to cool them after the step of heating is terminated.

In operation, the heating provided by wire 142 will heat heating element 130 and heat will be transferred to center section 92. This heat transfer is relatively rapid and a rapid temperature rise within mold cavity 100 adjacent the center section will occur. Because of thin wall cone 94 and thin wall cylinder 110, heat dissipation anteriorly and posteriorly will be restricted which permits the center section to rise in temperature to a value necessary to perform the thermoforming function intended. On completion of the thermoforming function, heating wire 142 will be de-energized. Heat dissipation to ambient air and through thin wall cone 94 to heat sink 96 and through thin wall cylinder 110 to heat sink 116 will reduce the temperature of center section 92 and within cavity 100 below a temperature sufficient to perform a thermoforming function. To enhance the rate of cooling, a source of compressed air or other gas can be directed through a nozzle to bathe the mold. The chilling effect of rapid expansion of the gas on discharge from the nozzle is particularly beneficial. A liquid could also be used to wash the mold and thereby draw off heat. Other rapidly acting and inexpensive procedures are contemplated. Accordingly, by the time the thermoplastic material upon which a thermal forming function was performed is withdrawn from within mold cavity 100 and a new thermoplastic material is inserted, the temperature of mold 90 will have dropped to a value insufficient to prematurely cause melting or deformation of the thermoplastic material upon insertion of same into the mold.

Mold 90 is preferably made of stainless steel or similarly robust and rigid material to ensure against wear and to provide accurate dimensioning of the thermoplastic material to be melted, welded, formed or extruded. Such molds have a low wear rate and are relatively long lived. However, wires 140,142 may become open or short circuited through normal use or suffer from separation with the wrapped heating element. In either event, the function of the heating element would be compromised. Accordingly, replacement of the heating element may be necessary from time to time. Moreover, for different thermoplastic materials different temperatures may be required to perform the functions of melting, forming, welding and extruding. To minimize costs attendant such replacement, the heating element is threadedly engagable and disengagable with the mold. To effect replacement of the heating element, mounting plate 70 is removed to provide access to heat sink 116. It may be threadedly disengaged from annular abutment 112. Thereafter heating element 130 may be threaded disengaged and passed posteriorly out of encircling relationship with mold 90. A replacement heating element would then be brought into threaded engagement with mold 90 and thereafter heat sink 116 would be remounted upon the mold. Alternatively, the mold can be removed from within housing 12 by removing mounting plate 60 to permit anterior withdrawal of mold 90 and heating element 130; if a posterior heat sink of the type identified by numeral 116 is used, it would first have to be disengaged from the mold.

Figure 5:
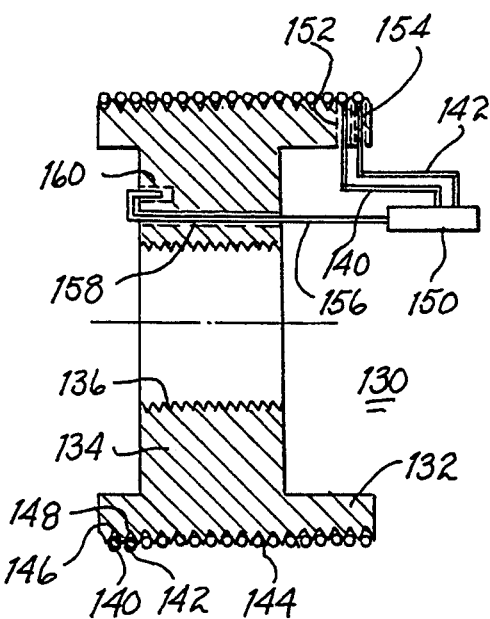
FIG. 5 is a cross-sectional view of a representative heating element.

Referring to FIG. 5, there is shown an enlarged view of heating element 130. Even though cylindrical surface 144 of the heating element is essentially smooth, adequate contact between such surface and wires 140,142 will exist. To increase thermal conductivity between wires 140,142 and sleeve 132 of heating element 130, a pair of helical grooves 146,148 are formed in the sleeve to receive wires 140,142, respectively. The resulting additional contact between the wires and the respective grooves will enhance heat transfer.

Wires 140,142 are relatively fine and have limited structural strength and rigidity. To permit disconnection and reconnection with an electrical signal source, a plug 150 is incorporated. Wire 140 extends from surface 144, whether smooth or grooved, through passageway 152 to a contact within plug 150. Similarly, wire 142 extends from surface 144 of sleeve 132 through passageway 154 to a further contact within plug 150. Plug 150 is positionally stabilized by a robust wire or other element 156 secured to a rigid part of heating element 130, such as diaphragm 134. A passageway 158 extends through the diaphragm to penetrably receive the end of the wire. The wire may be bent back upon itself for penetrable engagement with a further passageway 160. The resulting mechanical lock has been found to be sufficient to maintain plug 150 adequately rigid to preclude strain or stress on wires 140,142 sufficient to damage them. As illustrated in FIG. 5, the ends of wires 140,142 are electrically grounded to the heating element; it being understood that the wires are otherwise electrically insulated throughout their length.

Figure 6:
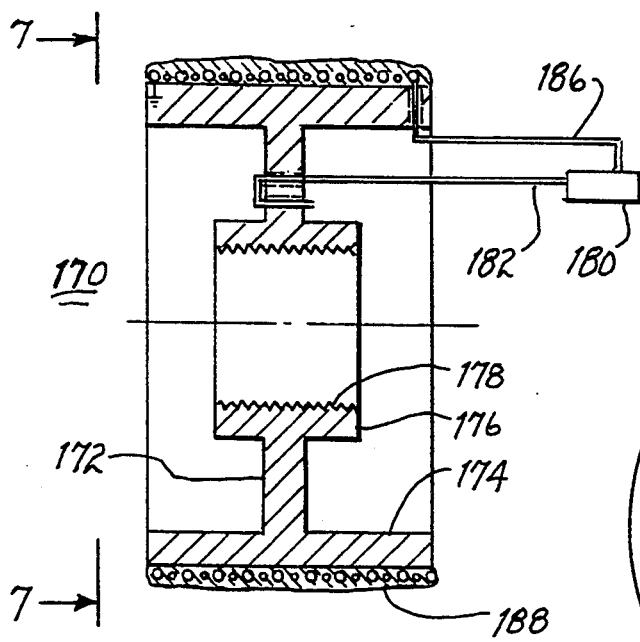
FIG. 6 is a cross-sectional view of a representative variant heating element.
Figure 7:
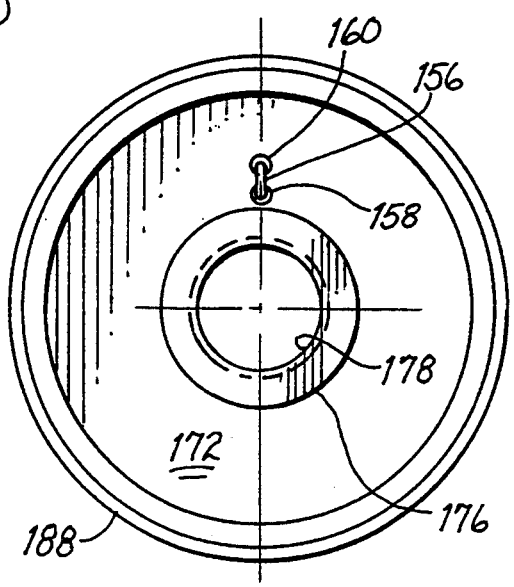
FIG. 7 is a view taken along lines 7—7 as shown in FIG. 6.

A variant 170 of heating element 130 is illustrated in FIGS. 6 and 7. A relatively thin wall diaphragm 172 interconnects sleeve 174 with a cylindrical element 176. Threads 178 are disposed interior of the cylindrical element for engagement with the center section of the mold to be heated. As noted, plug 180 is supported by wire 182 anchored within diaphragm 172. A single wire 184 is helically wrapped about sleeve 174. This single wire performs the dual functions of heating the heating element and of sensing the temperature of the heating element to provide a control signal for regulating the amount of RF energy applied to heat the heating element. One end of wire 184 is grounded, as indicated, and the other end of the wire is attached to a contact in plug 180. It is to be understood that a similar single wire may be used with the heating element 130 or a pair of wires may be used with heating element 170. To enhance heat transfer between the wire and the sleeve, a thermally conductive mastic 188 may be painted over the wire to enhance heat transfer. Because wire 184 is intended to sense the temperature of the heating element, the signal it generates may be skewed if the temperature it senses is, at least in part, the temperature of an adjacent coil of wire. For this reason, the use of such mastic may be best limited to special situations involving either a single wire or a pair of wires.

Copper has a higher capability to transmit heat than aluminum but it is relatively higher in thermal capacitance than aluminum. Thus, copper requires substantially more energy to be brought to a specific temperature than does aluminum. Accordingly, better overall performance is obtained through use of an aluminum heating element rather than a copper heating element.

As alluded to above, a single wire system can be used to heat the heating element provided that such wire has a relatively large thermal coefficient of resistance. That is, the resistance of the wire increases as a function of the increase in temperature of the wire. Such a single wire will provide the dual functions of heating the heating element and of providing a signal to the driving circuitry of the relative temperature of the wire and hence the temperature of the heating element. However, if a two wire system is employed, the compositions of the wires can be optimized for their intended uses resulting in more efficient heating and more accurate control signal generation. The heating wire may be of the type sold commercially under the name STABLOHM. By having essentially constant resistance irrespective of temperature, hot spots are avoided. With a wire having a large thermal coefficient of resistance a hot spot occurs when the wire becomes separated from the heating element (serving as a heat sink) because the heat transfer at the point of separation would be reduced. The resulting accumulation of heat would increase the temperature of the wire and with such increase, the resistance would increase resulting in more rapid heating. This produces an unstable condition witch a high potential of causing destructive damage. Furthermore, "the temperature to which the underlying heating element would be heated would be incorrectly sensed by the accompanying circuitry. The control wire, such as wire made of nickel and sold under the designation Nickel 211, provides a very substantial amplitude control signal since its resistance varies over a wide range as a function of the temperature of the wire. Since it does not heat and only senses temperature, separation from the heating element is unlikely to cause hot spots.

Preferably, lead wires are used from the plug to the heating element such Lead wires are of low resistance. Thus, the heating wire about the heating element would be attached at the heating element to a lead wire extending to the plug to prevent the development of runaway temperature increase since no heat sink is associated with the lead wire. The control wire is attached to a lead wire at the heating element in a similar manner to maintain the resistance of the control wire a function of the temperature the heating element only.

The plug may be a two pin connector with one pin connecting each wire to the respective output of the associated circuitry. The heating element and the circuitry may have a common ground. Alternatively, the plug may be a three pin plug having one pin providing a common ground to both wires and the driving electrical circuit, a second pin interconnecting the heating wire with the RF output of the circuit and a third pin interconnecting the temperature sensing control wire with the control section of the circuit.

Low resistance wire, such as copper or Nickel 30 wire, may be used as the lead wires since it does not heat up. Particular caution must be exercised at the junction of the lead wire and the single heating/control wire to ensure that the heating/control wire remains in good thermal contact with the heating element to prevent development of a hot spot. The plug or connector is rigidly attached to the heating element via a steel wire to minimize flexing of the lead-in wires.

Typically, the temperature drop between the heating wire and the underlying heating element is on the order of 30° C., depending in part upon the heat consumption of the mold or die. The heating wire is typically at a temperature of around 280° C. The temperature loss through the heating element to the die in contact with the thermoplastic material is on the order of 1° to 2° C. Accordingly, there is very little temperature drop across the heating element and the mold.

In a two wire system, the two wires are wrapped in parallel about the heating element and preferably apart from one another to permit the temperature sensing wire to be heated primarily by the contacted surface of the heating element rather than through contact with the heating wire. An insulator coating(s) of polyimide for the wires has been found preferable since it can withstand the temperature range contemplated without losing its electrical insulating properties. A polyimide coating may also be applied over the wires after the wires have been wrapped about the heating element to provide protection for the wires during handling.

Thin mandrels may be used to maintain the integrity of the interior of the thermoplastic tubing. Such mandrels are on the order of 0.020 inches in diameter and may be of steel or other metal since their mass is too small to draw heat of any consequential quantity from the mold. For larger mandrels, such as that used with a tracheal catheter, a mandrel of approximately one half inch must be used. To prevent unacceptable heat absorption, a high temperature dimensionally stable plastic mandrel is preferably used, which plastic may be of the type sold under the trademark TORLON. Alternatively, a hollow thin wall metal mandrel can be used.

FIGS. 8a and 8b illustrate a mold 430 usable primarily for abuttingly attaching two lengths of thermoplastic tubing for use as a catheter. Usually, the tip of the catheter is of relatively soft material to guide the catheter during insertion without causing injury to the vascular tissues. The remainder of the catheter is of stiffer thermoplastic tubing to permit application of a force to thread the catheter through an artery or vein. Typically, the diameter of the catheter is on the order of 0.020– 0.400 inches which corresponds with the cylindrical mold cavity or die 432 defined by mold 430. The mold includes an annular abutment 434 having threads 436 disposed on its exterior cylindrical surface. A heating element, such as that shown in FIGS. 1, 5 or 6, may be threaded on the annular abutment. Typically, the annular abutment may have a diameter of approximately 0.313 inches. Cylindrical sections 438,440 extend anteriorly and posteriorly from the annular abutment and define a thickness of approximately 0.005 inches. These cylindrical sections serve as thermal chokes to restrict heat transfer anteriorly and posteriorly from the annular abutment. Such restriction of heat transfer anteriorly and posteriorly minimizes heating at the opposed entry ways to the mold cavity to reduce the deformation of the thermoplastic tubing inserted prior to placement of the opposed abutting ends radially interior of the annular abutment and within the confines of the heat zone defined by the annular abutment. Thus, deformation of the ends of the thermoplastic tubing is avoided. An apertured disc 442 is supported by cylindrical section 438 and serves in the manner of a heat sink to draw heat from cylindrical section 438 and annular abutment 436 and to ensure that the entry way, defined by aperture 144 in the disc is relatively cool upon insertion of thermoplastic tubing therethrough. Entryway 444 may include a bevel or chamfer 443. Further, as discussed above and illustrated in FIG. 1, disc 442 may be secured to housing 12 to mount mold 430. An annular abutment 446 extends posteriorly from cylindrical section 440. It includes threads 448 disposed about its exterior cylindrical surface. A disc 450, having a threaded aperture 452, is threadedly engageable with annular abutment 446. Disc 450 serves in the manner of a heat sink to maintain the posterior entryway cool during insertion of the end of a length of thermoplastic tubing. It may be noted that disc 450 may be replaced with heat sink 116 depicted in FIG. 1. Entryway 454 may be bevelled to assist insertion of the thermoplastic to prevent collapse of the abutting ends of the two pieces of thermoplastic tubing, a mandrel (not shown) may be inserted within the tubing to extend across the abutting ends. A mandrel of a suitable type is drawn and described with respect to FIG. 9b.

On de-energization of the heating wire attendant the heating element in threaded engagement with annular abutment 434, the annular abutment will begin to cool. To insure sufficiently rapid cooling, blast of cooling medium, such as air or a chilled gas (nitrogen) may be employed. For this purpose, a nozzle 455 directs the cooling medium 456 toward and about the annular abutment and the threadedly attached heating element (not shown). The nozzle is connected via a conduit 457 to a source 458 of cooling medium. It is actuated by the attendant control circuitry.

FIGS. 9a, 9b and 9c illustrate a mold 460 for rounding the edges at the end of a length of thermoplastic tubing. The mold includes a die 462 having a cylindrical section terminated by a radially interiorly converging section 464 terminating at a diameter essentially equivalent with the interior diameter of the tubing. A ring 466 includes threads 168 disposed at its outer cylindrical surface for threaded engagement with a heating element, such as a heating element depicted in FIGS. 1, 5 and 6. The radial thickness of the die corresponding with converging section 464 reduces anteriorly to a radial wall thickness of approximately 0.007 inches adjacent hollow boss 470 of heat sink 472 which hollow boss defines the cylindrical section of die 462. This physical reduction in cross-sectional area tends to serve in the manner of a restrictor or thermal choke to reduce heat flow anteriorly of section 464 to prevent premature heating of the tubing and upon insertion of the tubing into die 462. What heat transfer does occur is relatively rapidly dissipated throughout heat sink 472. Accordingly, the heat generated by the heating element in threaded engagement with ring 466 is essentially contained within the ring and section 464. Heat sink 472 includes a disc 474 having a beveled entry 476 into die 462. Disc 474 may serve as a mounting for mold 460, in the manner depicted in FIG. 1.

To form the end of a piece of thermoplastic tubing, a mandrel 480 is inserted through passageway 484 defined by ring 466 and through hollow boss 470. The mandrel may be secured to mounting block 482 or to posterior mounting block 70 shown in FIG. 1. A length of thermoplastic tubing to be formed is brought into engagement with mandrel 480 and slid therealong until it is forced against converging section 464. Simultaneously, the heating element cooperating with ring 466 is energized and converging section 464 will have become heated to a temperature sufficient to melt and form the end of the tubing in conformance with the configuration of converging section 464. The presence of mandrel 480 prevents the open end of the tubing from closing or otherwise becoming restricted due to flow of the thermoplastic material during forming of the tubing end.

Figure 10B:
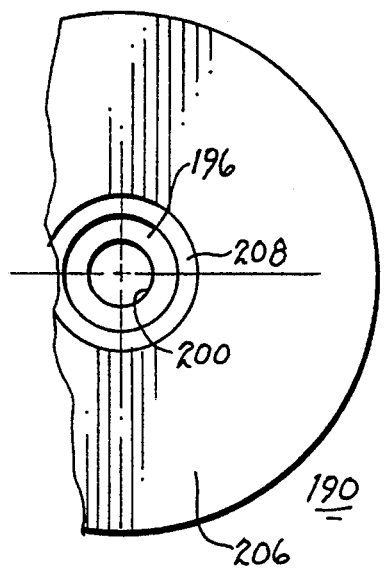
FIGS. 10a and 10b illustrate a cross-sectional view and a frontal view of a mold for tapering tubing.
Figure 10A:
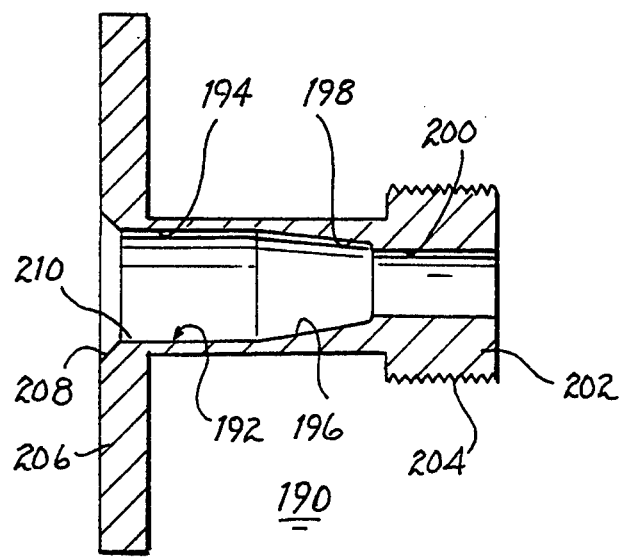

Referring to FIGS. 10a and 10b, there is illustrated a mold 190 similar to that show in FIGS. 9a, 9b and 9c, for forming the end of a catheter. Die 192 of the mold includes a cylindrical section 194 commensurate in diameter with that of the tubing to be formed. A truncated cone section 196 extends from the cylindrical section and terminates at an inwardly curved end section 198. A cylindrical passageway 200 extends posteriorly therefrom for supporting a mandrel to be inserted within the tubing during forming of the catheter end (see for example FIG. 9b). The diameter of cylindrical section 200 is commensurate with the mandrel to minimize flashing of the thermoplastic material between the mandrel and the cylindrical section. Ring 202 includes threads 204 for threaded engagement with a heating element of the type discussed above. Heat from ring 202 is transferred anteriorly through end section 198 and into cone section 196. The wall thickness of cylindrical section 194 is relatively small (0.006 inches) to restrict further anterior heat transfer. What heat may be transferred through cylindrical section 194 is rapidly dissipated by apertured disc 206. Thereby, the interior end of mold 190 is maintained relatively cool and at a temperature insufficient to cause premature melting of the thermoplastic tubing upon insertion of same into die 192. To ease insertion of the tubing, a bevel 208 may be formed in entryway 210 of the disc. Mounting of mold 190 may be the same as shown in FIG. 1 for disc 96 of mold 90.

Figure 11B:
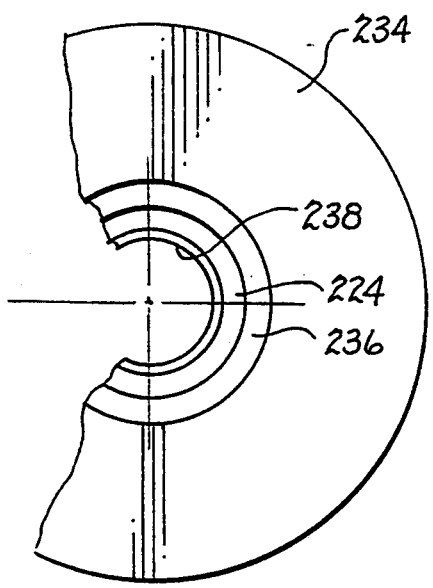
FIGS. 11a and 11b illustrate a cross-sectional view and a frontal view of a mold to bevel bias cut tubing.
Figure 11A:
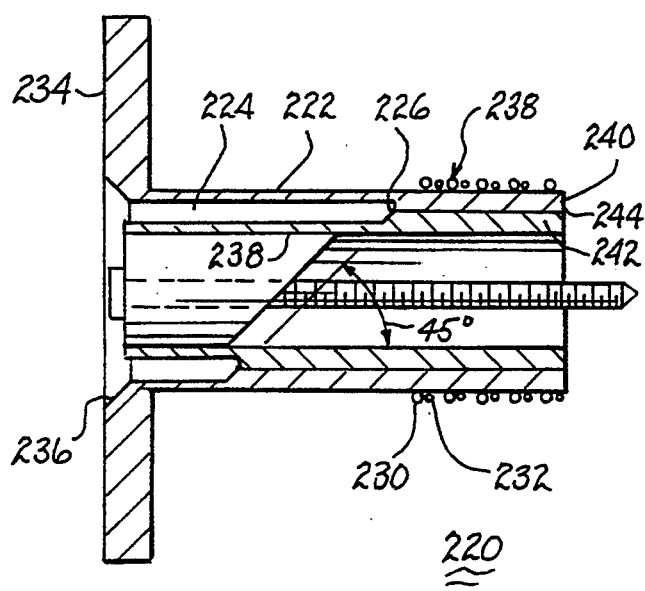

Sometimes it is necessary to employ a catheter having an end cut at a bias, such as 45°. A mold 220 for eliminating the sharp edges and smoothing the end wall of the tubing is illustrated in FIGS. 11a and 11b. A cylindrical element 222 is formed with an annular cavity 224 having a semicircularly curved end wall 226. The end wall may define an angled plane commensurate with the bias (45°) at which the tubing is cut. A heating element 228 may be formed of wires 230,232 wrapped about cylindrical element 222 posteriorly of annular cavity 224. Wires 230,232 are similar in composition and purpose with wires 140,142 discussed above with respect to the heating element shown in FIG. 1. That is, wire 230 is a heating wire, the resistance of which remains essentially constant as the temperature increases while wire 232 is a control wire for sensing an increase in temperature as a function of an increase in resistance commensurate with a rise in temperature of the heating element. It is to be noted that a single wire serving the two functions of heating and generating a control signal can be used in place of the two wires. The thin wall construction of the cylindrical element adjacent annular cavity 224 serves in the manner of a thermal choke to minimizes heat flow thereinto and the temperature can be maintained below the temperature necessary to cause melting of the tubing inserted within the cylindrical cavity. Thereby, deformation due to softening or melting of the end of the tubing will not occur during insertion of the tubing. To ensure a below melting point temperature of the anterior end of cylindrical cavity 224, an apertured disc 234 extends radially from cylindrical element 222. It serves in the manner of a heat sink to draw the heat that may be present in the cylindrical element. To facilitate insertion of the end of the tubing, a bevel 236 may be formed as part of the aperture of the disc. To minimize the mass of mold 220, the interior is hollow and defines a cylinder 238. To assist in maintaining interior of cylinder 238 cool or at least below the melting temperature of the thermoplastic material to be formed, a plug 246 may be secured interior of the cylinder and at the anterior end thereof. The plug may include a posterior end 247 formed at a bias of approximately the bias of end wall 226 (45°). Thereby, heat will transfer by conduction from interior wall 248 of cylindrical element 222 to the plug and the plug will serve in the manner of a heat sink. A bolt 249 or post may extend from plug 246 to attach and mount the plug and cylindrical element 222 upon a mounting block (not shown) or the like.

Depending upon the degree of tolerance between the radial width of cylindrical cavity 224 and the thickness of the tubing wall placed therein, air may become trapped against end wall 226 upon insertion of the tubing. Such trapped air may affect the configuration of the end of the tubing. To relieve the pressure presented by such trapped air, mold 220 may be formed of two concentric sleeves 240,242. Interface 244 between these sleeves accommodates enough leakage of trapped air to eliminate any air pressure acting upon the end of the tubing during forming of same. By experimentation, such trapped air can also be eliminated by cutting the tubing at an angle less than the bias of end wall 226 of cylindrical cavity 224. Thereby, the initial contact between the end of the tubing and end wall 226 will be at the toe (front end) of the tubing. Moreover, the location of heating element 224 will result in an anterior heat flow in mold 220. Such anterior heat flow will first melt and form the toe of the tubing and thereafter progressively melt the end of the tubing toward the heel. The progressively melted tubing will mechanically force any air adjacent end wall 226 to flow toward the heel and thereafter between the tubing and the short axial length presented by the cylindrical cavity at the heel of the tubing. With this procedure, the complexity attendant using two sleeves, 240,242 will be eliminated.

Heating element 228 is indicated as being formed upon the posterior end of mold 220. It is to be understood that a heating element of the type illustrated in any of FIGS. 1, 5 or 6 may be attached to the mold. The only modification necessary to mold 220 is that of adding a sufficient annular abutment to support the necessary threads. However, depending upon the thickness of the posterior end of mold 220, the threads may be formed in the mold itself and the annular abutment may be eliminated.

Figure 12A:
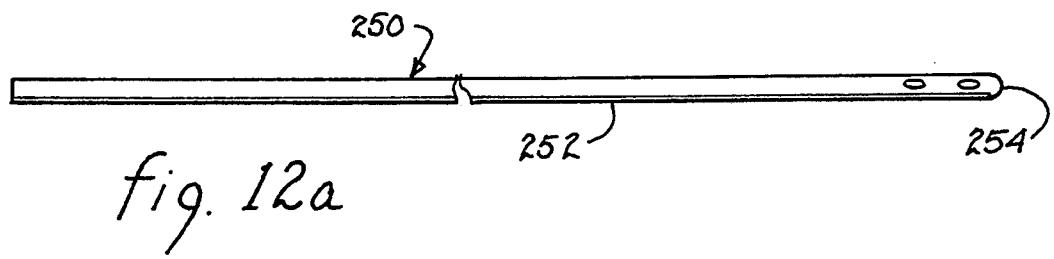
FIGS. 12a and 12b illustrate a representative urethral catheter and the tip of the catheter after forming same.
Figure 12B:
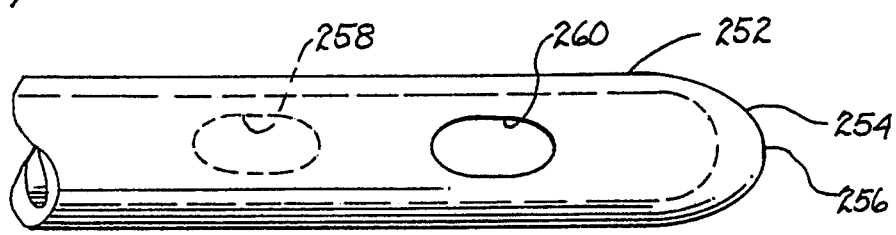

A urethral catheter 250 comprises a length of hollow tubing 252, as illustrated in FIGS. 12a and 12b, and a rounded distal end 254. To provide evacuation through the catheter, a pair of apertures 258,260, sometimes referred to as eyes, are disposed on opposed sides of tubing 252 proximate distal end 254. To minimize abrasion of the urethra, these apertures are preferably elongated or ellipsoid shaped, as illustrated.

Figure 13B:
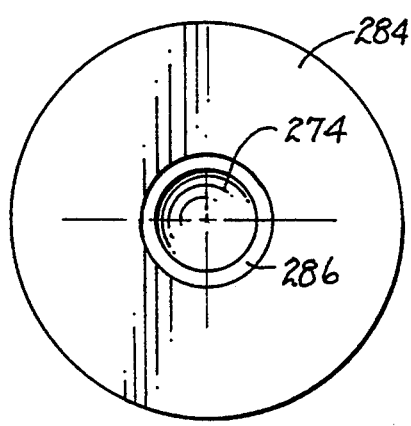
FIGS. 13a and 13b illustrate a cross-sectional and a frontal view of a mold for a urethral catheter.
Figure 13A:
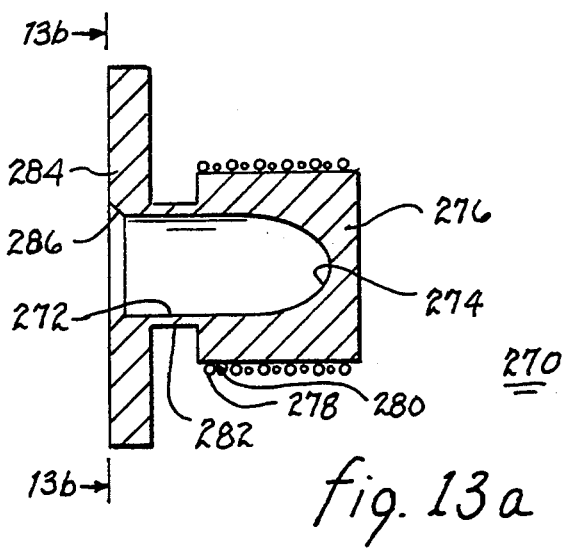

Referring to FIGS. 13a and 13b, there is illustrated a mold 270 for forming the distal end of catheter 250. The mold includes a cylindrical entry way 272 and a generally ellipsoid shape die 274. The die is formed within a cylindrical block 276, which block is of low thermal capacity material, such as aluminum, for reasons discussed above. The cylindrical block may be directly heated by a helically wrapped heating wire 278 disposed thereabout. A further temperature control wire 280 is helically interleaved between wrappings of the heating wire to provide a control function for the amount of heating performed by heating wire 278. Alternatively, cylindrical block may include threads disposed about its outer cylindrical surface for threaded engagement with a heating element of the type illustrated in FIGS. 1, 5 or 6. It may be noted that a single wire for both the heating and control functions may be wrapped about block 276 or about a heating element attached thereto. A thin wall cylindrical section 282 extends anteriorly from cylindrical block 276 to minimize heat transfer into entry way 272 and to retain the heat radially interior of the cylindrical block. To assure a low temperature at the entry way, an apertured heat sink 284 is disposed at the anterior end of the cylindrical section. The aperture of the disc may include a bevel 286 to provide a guiding function for the tubing to be inserted into entry way 272.

In operation, the distal end of a urethral catheter to be formed is inserted through entry way 272 into contact with die 274. The die, being heated by heating wire 278, will melt the end of the tubing and, in response to insertion pressure applied to the tubing, will close upon itself and reform into a closed end having an apex of significantly greater thickness than the wall thickness of the tubing. On completion of the forming operation, heating is terminated and the urethral catheter is withdrawn from within mold 270.

Figure 14B:
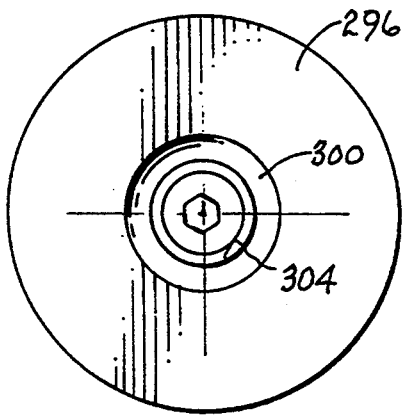
FIGS. 14a and 14b illustrate a cross-sectional and a frontal view of a mold for finishing the end of a tracheal catheter.
Figure 14A:
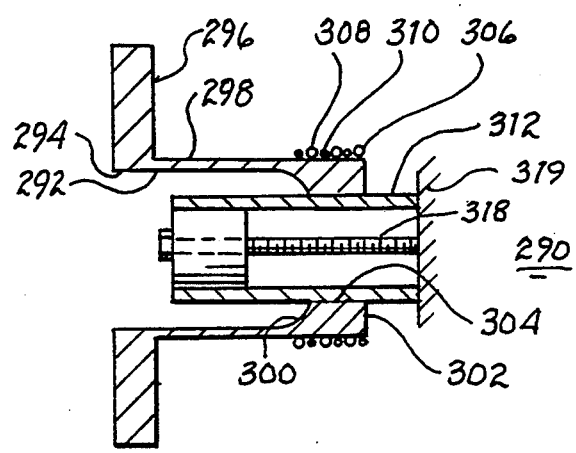

A tracheal catheter is a curved tube of semi-rigid plastic to establish an air way for a choking person. The plastic must be of sufficient rigidity to prevent collapse during insertion but some flexing may be necessary to accommodate passage through the oral cavity and into the trachea. The distal end of the catheter must be smoothed to minimize abrasion or injury to the soft tissues within the oral cavity and the trachea. Referring to FIGS. 14a and 14b, there is illustrated a mold 290 for rounding the distal edge of a tracheal catheter. Mold 290 serves a purpose similar to that of mold 460 illustrated in FIGS. 9a and 9b except that the tubing for which mold 460 was developed is on the order of 0.15 inches in diameter while a tracheal catheter is on the order of 0.557 inches in diameter. Accordingly, different considerations attendant heating and heat dissipation of mold 290 must be accommodated. The mold 290 includes a cylindrical entry way 292 defined in part by aperture 294 formed in disc 296, which disc serves as a heat sink. A cylindrical thin wall section 298 extends posteriorly from disc 296 to die 300. The die is a radially inwardly curved surface terminating at a diameter essentially equivalent to the interior diameter of the tracheal catheter inserted within mold 290; this dimension may be on the order of 0.400 inches. A cylindrical block 302 defines in part die 300 and includes an interior cylindrical surface 304. The cylindrical block may include an exterior cylindrical surface 306 about which may be wrapped in helical interleaved manner a pair of wires 308,310 serving the function of heating and temperature control, as discussed above. Alternatively., cylindrical surface 306 may be threaded to threadedly receive a heating element, such as one of the heaters disclosed in FIGS. 1, 5 or 6. Alternatively, a single wire for both the heating and control functions may be wrapped about block 302 or about a heating element attached thereto. A mandrel 312 is insertable through the mold and adjacent cylindrical surface 304 to provide support for the interior surface of the tracheal catheter and to prevent collapse or deformation of the distal end of the tracheal catheter. To assist in maintaining surface 314 of the mandrel proximate entryway 292 cool or at least below the melting temperature of the thermoplastic material to be formed, a plug 316 may be disposed at the anterior end of the plug. This plug will serve as a heat sink. A bolt 318 or post penetrably engages the plug and is threaded into mounting block 319 or the like to support the plug and the mandrel. The mandrel may be made of heat tolerant plastic, such as that sold under the trademark TORLON; alternatively, it may be a solid or hollow metallic cylinder. Depending upon the mass and material of the mandrel, it may have greater or lesser thermal capacity. Because of the physical contact between the mandrel and the cylindrical block heat will be transferred to the mandrel. Accordingly, sufficient power from the wire(s) or heating element must be provided to compensate for such heat transfer to the mandrel. Generally, entry way 292 need not include a beveled surface at the inlet in view of the size and semi-rigidity of the tracheal catheter.

Intravenous catheters include a hollow needle for penetrably engaging a vein of a patient. A sleeve is disposed about the needle, which sleeve is usually made from thermoplastic material sold under the trademark TEFLON. After penetration of the needle into the vein, the sleeve is slid along and guided by the needle until its opening is disposed within the vein. Thereafter, the needle is withdrawn and the extending end of the sleeve is connected via tubing to a source of fluid to be delivered intravenously. To facilitate sliding insertion of the intravenous tubing guided by the needle, the end of the tubing should be tapered with a small slope. A mold 320 for this purpose is illustrated in FIGS. 15a and 15b. The mold includes an apertured disc 322 serving the function of a heat sink and as a mounting member for the mold, as illustrated in FIG. 1. It also includes a beveled surface 324 to assist in inserting a length of tubing into entry way 326. The entryway is defined in part by a thin walled cylindrical section 328 extending posteriorly from disc 322. An annular abutment 330 includes a cylindrical surface having threads 332 formed therein for threaded engagement with a single or two wire heating element of the type illustrated in FIGS. 1, 5 or 6. A die 334, which is cone shaped with a small slope, is formed within annular abutment 330. A cylindrical passageway 336 extends posteriorly from die 334, which passageway is of a diameter commensurate with the needle to be used with the intravenous catheter.

In operation, a mandrel, such as that illustrated in FIG. 9b, is inserted from the posterior end of mold 320 through cylindrical passageway 336. Preferably, such mandrel extends anteriorly past entryway 326 to ease engagement with the length of tubing to be formed. The tubing is slid along the mandrel after energization of the heating element to heat die 334. Upon contact of the tubing with die 334, it will be reformed to the tapered shape of the die. Collapse is prevented by the inserted mandrel.

Cylindrical section 328 serves in the manner of a thermal choke to minimize heat flow into the entryway. Whatever heat flow does occur is dissipated by disc 322 serving as a heat sink. Thereby, entryway 326 will be maintained sufficiently cool to prevent melting or deformation of the tubing during insertion. The effect of the thermal choke is also that of maintaining the heat within the heat zone of the mold, die 334.

Multiple lumen catheters are often used in conjunction with inflatable balloons for various purposes relating to angioplasty procedures. To butt weld a length of tubing to only one lumen of a plural lumen catheter is technically very difficult. Referring to FIG. 16a there is shown a two lumen catheter 350 having a cross-section illustrated in FIG. 16b. A single lumen tubing 352 is shown in FIG. 16d and has the cross-section illustrated in FIG. 16e. To prepare the two lumen catheter for butt welding with the single lumen catheter, wall 354, defining lumen 356, is cut away, as illustrated by cut-line 358 shown in FIG. 16a. The terminal end of catheter 350 will include essentially only end wall 360 defining lumen 362, as illustrated in FIG. 16c. Wall 364 of single lumen catheter 352 defines lumen 366, as shown in FIG. 16e.

Figure 17B:
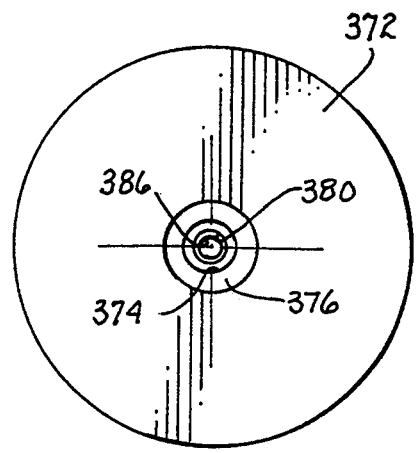
FIGS. 17a and 17b illustrate a cross-sectional and frontal view of a mold for joining the catheters shown in FIGS. 16a–16e.
Figure 17A:
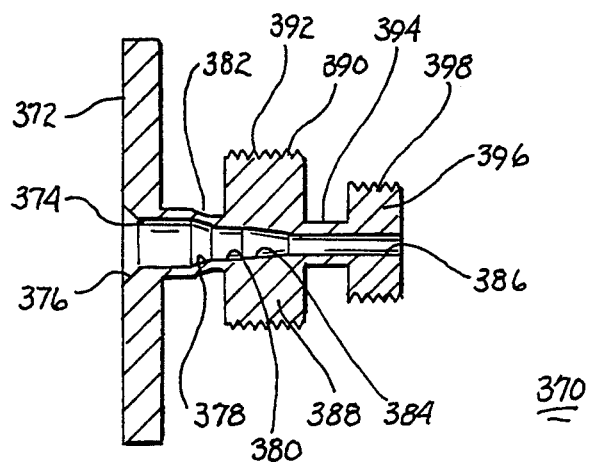

To butt weld the end of catheter 352 with catheter 350, a mold 370 of the type shown in FIGS. 17a and 17b may be used. Mold 370 includes an apertured disc 372 serving as a heat sink. Passageway 374, defining the aperture in the disc, may include a beveled entry 376 to facilitate insertion of catheter 350. The passageway is necked down by cone 378 interconnecting the passageway with a lesser diameter cylindrical section 380. The posterior end of passageway 374, cone 378 and the anterior end of cylindrical section 380 are defined by round tube element 382 serving as a thermal choke. A further cone 384 reduces the cavity within mold 370 from that of cylindrical section 380 to cylindrical section 386, which cylindrical section is of a diameter commensurate with catheter 352. Annular abutment 388 encircles cone 384, the posterior segment of cylindrical section 380 and the anterior segment of cylindrical section 386. Cylindrical surface 390 of the annular abutment may include threads 392 to threadedly engage a single or dual wire heating element of the type illustrated in FIG. 1, 5 or 6. A cylindrical section 394 extends posteriorly from the annular abutment to serve as a thermal choke. A further annular abutment 396 extends about the posterior end of cylindrical section 386 to serve in the manner of a heat sink. Annular abutment 396 may include threads 398 for threadedly engaging an apertured disc serving as a heat sink.

Upon heating of annular abutment 388, the die in the mold formed primarily by cone 384, the anterior end of cylindrical section 386 and the posterior end of cylindrical section 380 will be heated. Due to the thermal choke provided by round tube element 382 and cylindrical section 394, minimal heat will be transferred laterally in each direction from the annular abutment.

Figure 18:
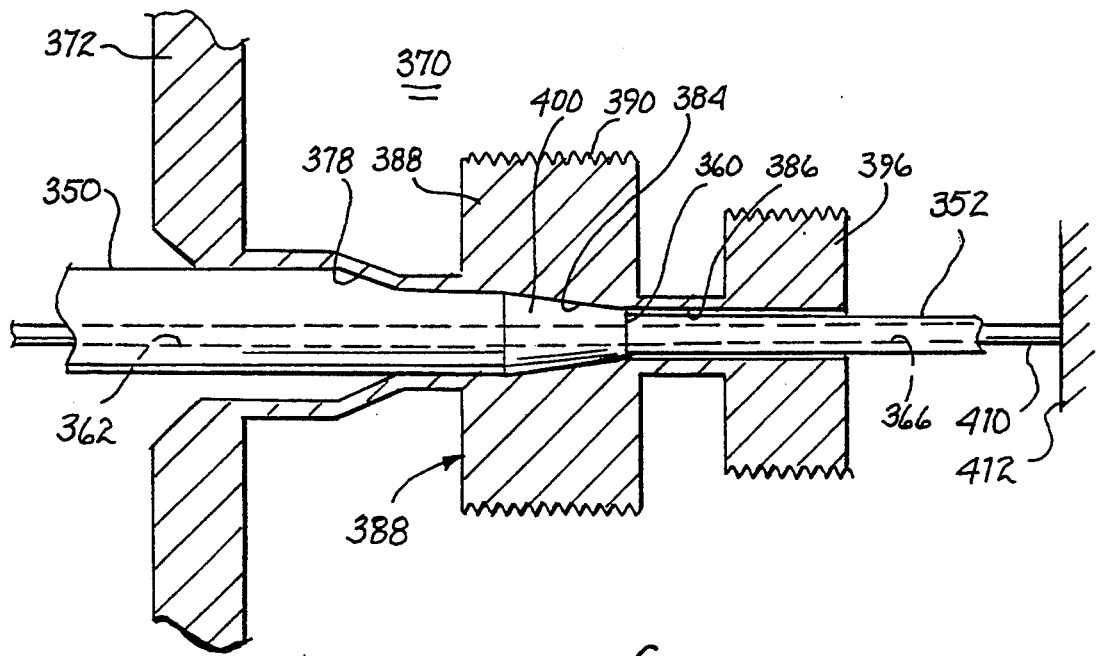
FIG. 18 illustrates a cross-sectional view of the joining of two dissimilar catheter tubes within a mold.

Referring to FIG. 18, there is illustrated a procedure for butt welding catheter 352 to end wall 360 of catheter 350. A mandrel 410 extends from a mounting 412 through lumen 366 of catheter 352 to prevent collapse of the catheter. Furthermore, the mandrel extends from the end of catheter 352 past beveled entry 376 to permit mounting and penetrable engagement with lumen 362 within catheter 350. A method of operation includes penetrably mounting catheter 352 upon a mandrel 410 extending from a mounting 412 and sliding the mounted catheter through mold 370 sufficiently to expose the tip of the mandrel. The exposed tip of the mandrel is inserted within lumen 362 and catheter 350 is pushed up against the end of catheter 352. Catheter 350 is translated toward the die in the mold. When end wall 360 of catheter 350 comes into engagement with cone 384, resistance to further translation will be evident. Upon energization of a single or two wire heating element associated with annular abutment 388, the die will become heated to a temperature sufficient to melt end segment 400 of catheter 350 and defining, in part, lumen 362. Such melting in combination with further insertion of the catheter will result in reforming of the end segment and will permit further translation of catheter 350 into the mold. Simultaneously, the end of catheter 352 abutting catheter 350 will melt and become welded to end wall 360. The configuration of cone 364 will neck down end segment 400 of catheter 350 to a diameter equivalent to that of catheter 352. By appropriate configuration and location of cut-line 358 in catheter 350, the remaining enlarged part of the catheter will interferringly engage cone 378, which cone is too cool to cause melting of the catheter. Accordingly, further translation of the catheter will be severely restricted. The resulting relocation and reformation of end segment 400 of the catheter will have placed end wall 360 at the junction between cone 384 and cylindrical section 386; thereby a smooth surfaced transition from catheter 350 to catheter 352 is achieved at the weld between the two parts. Simultaneously, the opening defining lumen 356 will be unaffected since it abuts the cool surface of cone 378. After the end of catheter 350 has been formed and welded to catheter 352, heat is no longer applied to annular abutment 388 and cooling may commence. As soon as the annular abutment is too cool to cause further melting, catheter 350 and the attached catheter 352 is withdrawn from within mold 370 and mandrel 410 is left in place.

Figure 19A:
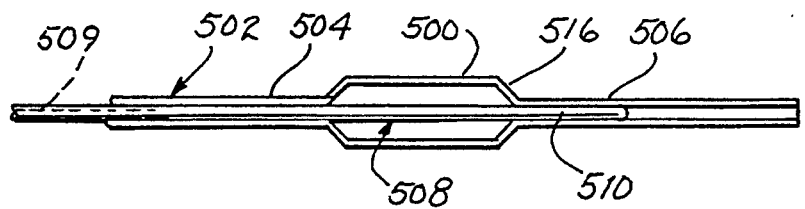
FIGS. 19a illustrates a balloon and an encircled length of tubing prior to welding of same.
Figure 19B:
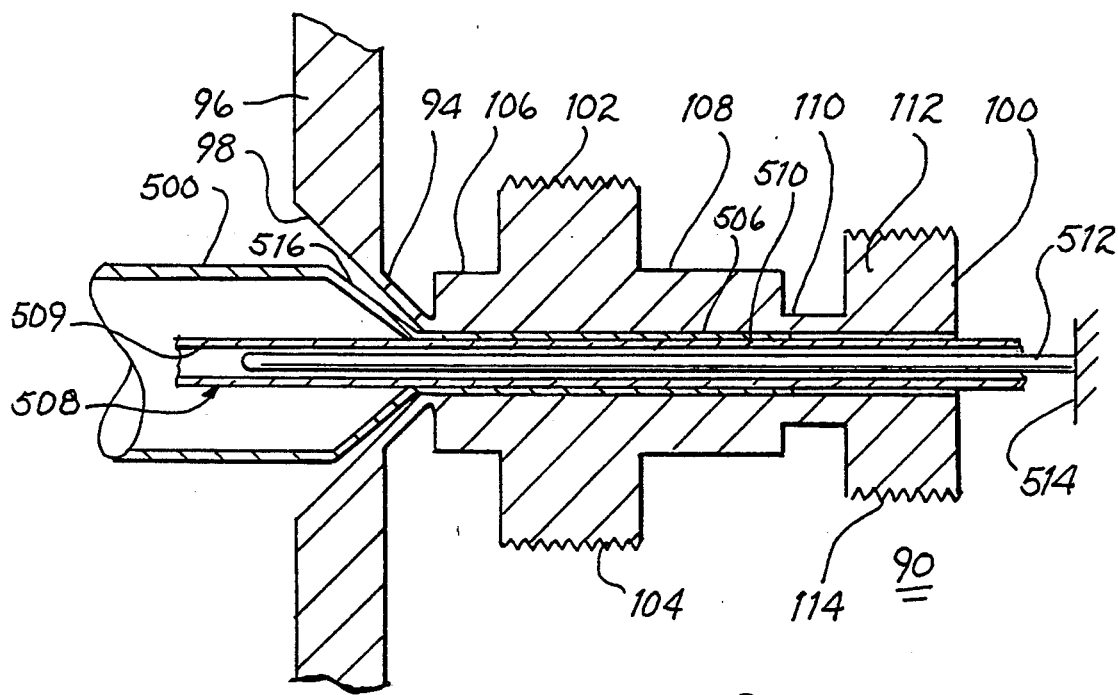
FIG. 19b illustrates location of the balloon and tubing shown in FIG. 19a placed within a mold of the type shown in FIG. 1.

FIG. 19a illustrates an inflatable balloon 500 formed as part of an expanded segment of a length of tubing 502 with elements 504 and 506 of the tubing extending in each direction from the balloon. The material of tubing 502 is irradiated polyethylene which is a polyolefin material cross-linked by irradiation. The technique for forming such a balloon is well known. One of the properties of this material after formation of the balloon is that it will revert to its initial size/configuration upon application of heat at a determinable temperature. A length of conduit 508, including one or more lumen 509, is inserted through tubing element 504, balloon 500 and into tubing element 506. To form a bond between tubing element 506 and conduit element 510 inserted within tubing element 506, mold 90, as shown in FIG. 1 and in FIG. 19b, may be employed. A mandrel 512, extending from a mounting 514 (such as mounting plate 70 shown in FIG. 1), is penetrably inserted through mold cavity 100 of mold 90 and protrudes beyond disc 96. The mandrel penetrably engages tubing element 506 and conduit 508 to an extent at least equivalent to the length of conduit element 510. Upon such mounting of the combination of balloon 500 and conduit 508, anterior end 516 of the balloon will be disposed generally adjacent thin wall cone 94 and cone 98. In this position, conduit element 510 will be coincident with the heat zone defined by annular ridge 106, annular abutment 102 and annular ridge 108.

As discussed above with respect to FIG. 1, a heating element is threadedly secured to annular abutment 102 to heat the annular abutment. The heat from the heating element will be rapidly transmitted to the annular abutment and the two annular ridges to define a heat zone essentially commensurate in length with conduit element 510. Thin wall cone 94 and cylinder 110 serve as thermal chokes to minimize heat flow therepast. Upon energization of the heating element, annular abutment 102 and annular ridges 106,108 will rapidly heat to a predetermined temperature. This temperature is selected to cause tubing segment 506 to shrink to its initial size. Such shrinking will result in a tight pressure fit about conduit element 510. Because of the thermal choke provided by thin wall cone 94 and the heat dissipation provided by disc 96, an insufficient temperature rise of the components of mold 90 adjacent balloon 500 will result and the configuration of the balloon will be unaffected.

Figure 19C:
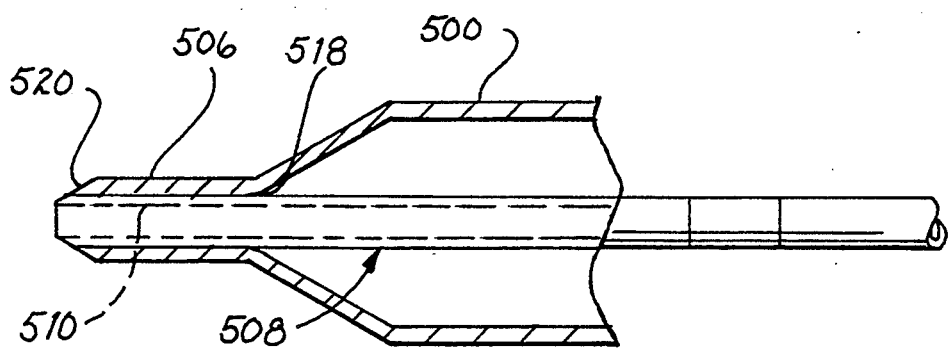
FIG. 19c illustrates a balloon secured to an encircled length of tubing.

Upon completion of the shrinking of tubing element 506, the anterior of the tubing element and conduit element 510 are formed in the mold shown in FIG. 15a, as shown in FIG. 19c. It is to be understood that the configuration of the trimming of the anterior end of the balloon/tubing combination is a function of the angioplasty procedure to be performed. Posteriorly from the seal between tubing element 506 and conduit element 510 exists an axial length 518 constituting delamination between tubing element 506 and conduit 510. The length of such delamination is on the order of 0 to 2 millimeters. The length of taper 520 may range from 0.5 to 1.0 millimeters. Although the conduit 508 having a single lumen is illustrated, it is to be understood that a multi lumen conduit could be similarly circumscribed by and secured to tubing element 506 extending anteriorly from balloon 500.

Figure 20A:
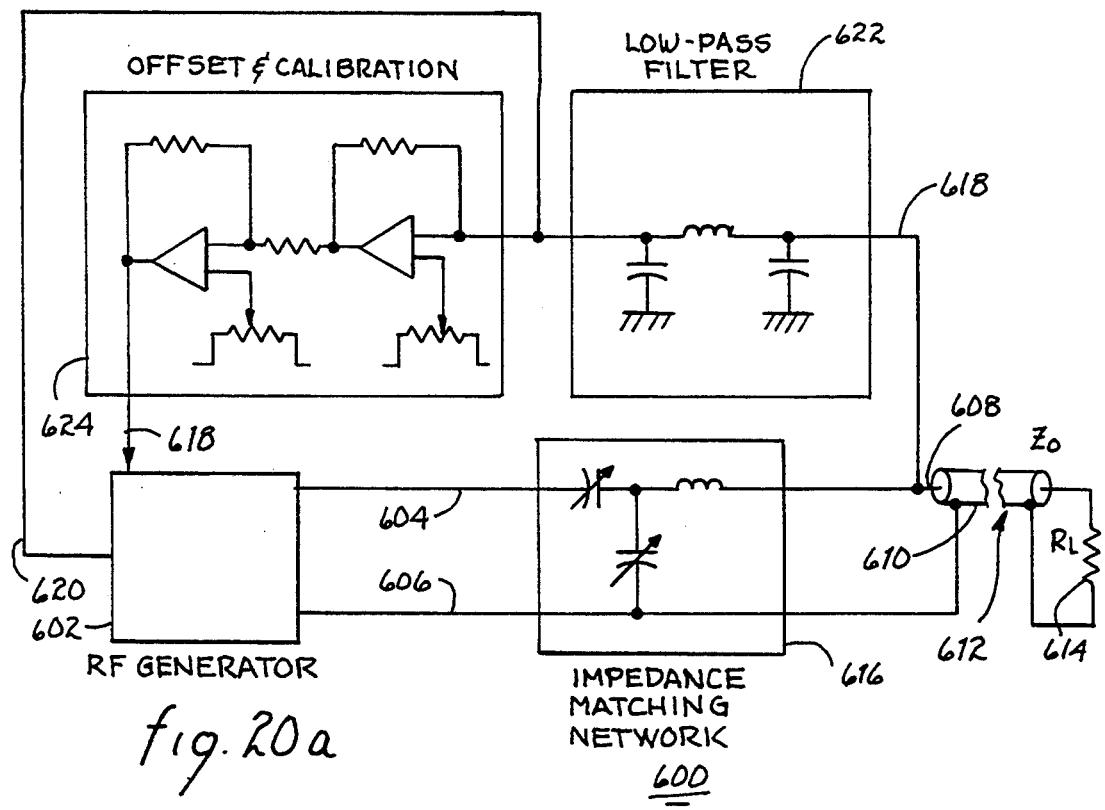
FIG. 20a illustrates a circuit in block diagram form of a single wire system for heating and for temperature managing the heating element of a mold and FIG. 20b illustrates a modification of the circuit to provide a two wire system for heating and for temperature managing the heating element of a mold.
Figure 21A:
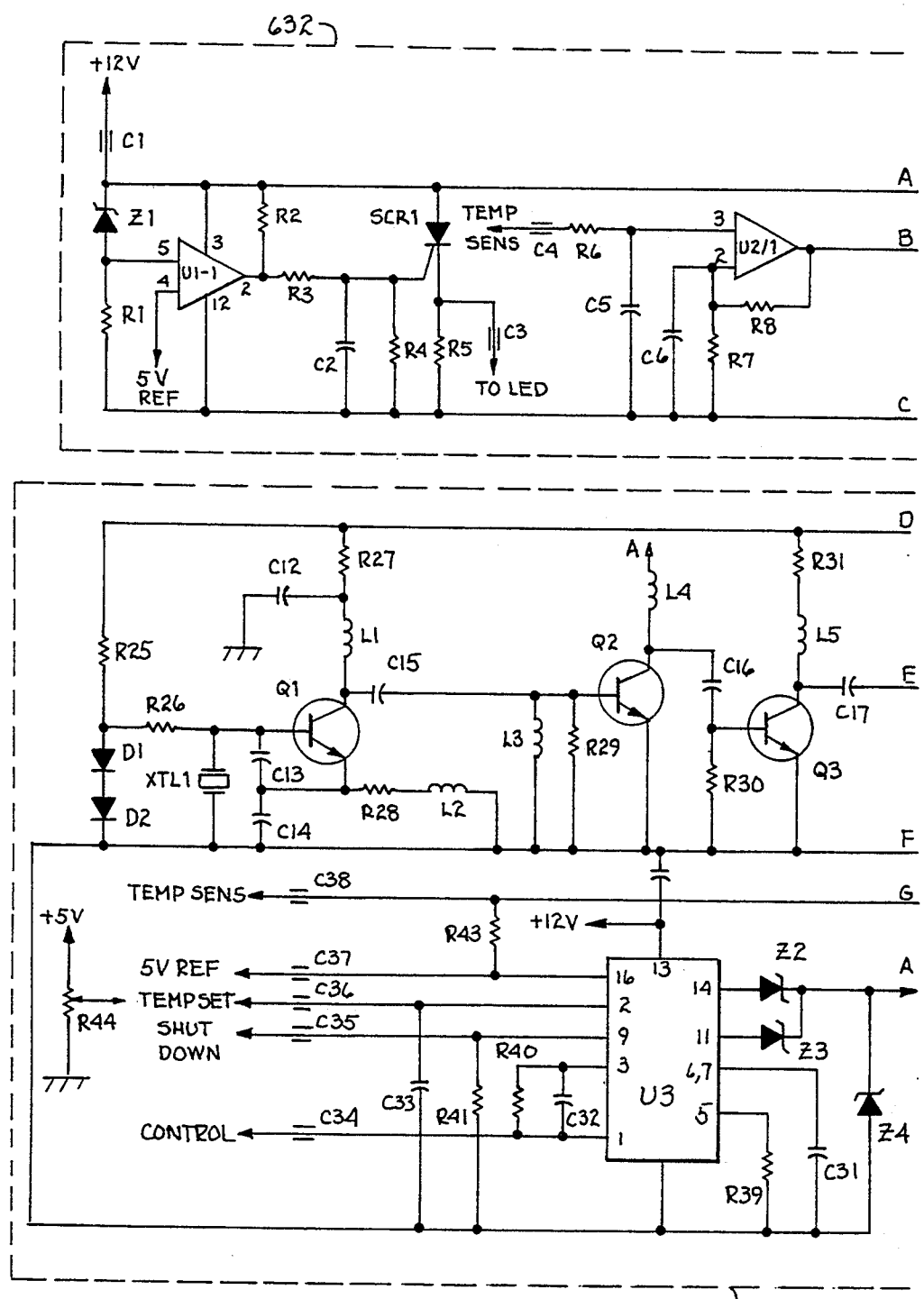
Figure 21B:
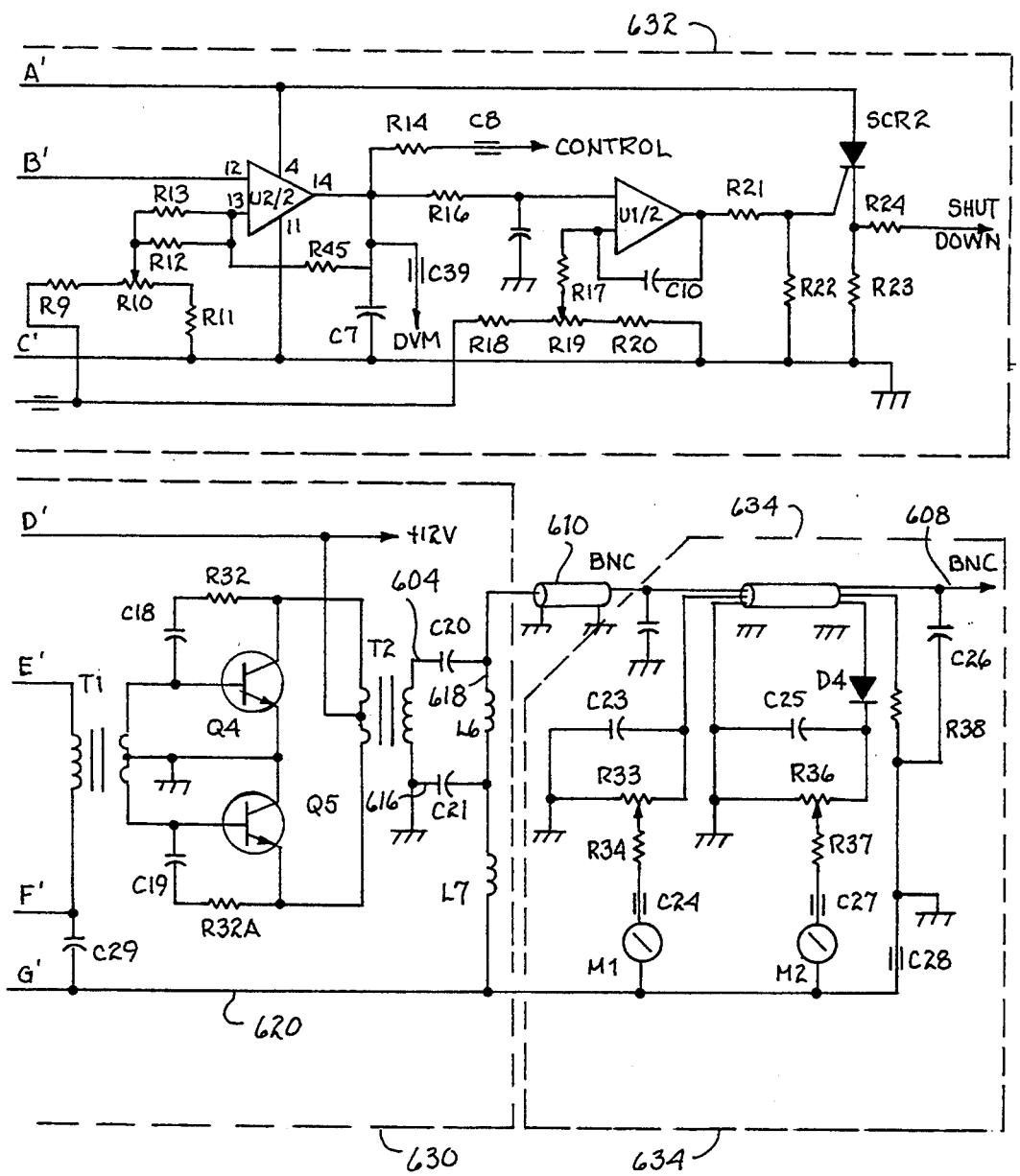

Referring to FIGS. 20a, 21a and 21b, there is illustrated a circuit 600 in block form and in detail, respectively, for generating an RF signal usable in conjunction with any of the above described heating elements and molds or variants thereof. The circuit is an AC or DC powered RF generator with a voltage responsive component to heat, monitor and maintain a constant and presettable temperature of the heating wire (load) wound about the heating element (or mold) with the capability of initially temperature calibrating the load and subsequently maintaining the load temperature during use at a preset and/or user managed temperature. The benefits available from this circuit include: (1) to provide exact energy to heat the heating wire; (2) to maintain a constant and presettable temperature of the heating wire; and (3) to provide temperature calibration of the heating wire immediately prior to use to insure temperature accuracy during the melting, forming, welding or extruding procedure performed within the mold.

To provide an overview, the philosophical considerations and generalized operation of circuit 600 will be discussed first. The heating and temperature control functions can be performed by a single wire system associated with the heating element which heats the heating element and generates a signal reflective of its temperature. Alternatively and as discussed above, a two wire system can be used to heat the heating element and to control the temperature. Such a two wire system permits optimizing the parameters preferable for each wire and eliminates the possibility of "hot spots" due to separation (absence of adjacent heat sink) between the single wire and the heating element (mold). Radio frequency (RF) energy is provided to heat the heating wire. This energy is generated by an RF energy source and transmitted through transmission media, such as a coaxial cable. The value of the electrical resistance of the heating wire (or a companion control wire in a two wire system) must change as a function of temperature (have a high thermal coefficient of resistance). By measuring this change in value of resistance, it is possible to determine the temperature or to correlate the temperature with a change in resistance. The resistance of the heating wire (or control wire) can be measured in the single wire system by applying a constant DC current or a relatively low frequency constant AC current through the transmission media to the load. The DC current or low frequency AC current can be isolated from the RF energy transmitted by use of a low pass filter or by time multiplexing techniques. For a two wire system, the second conductor may be separate or a part of the transmission media. By providing a constant current source for the DC current or low frequency AC current, a change in electrical resistance of the heating wire (or control wire) as a function of the temperature of the heating wire (or control wire) will produce a voltage responsive to the change in electrical resistance. This voltage change can be sensed and the change is used to regulate the power of the RF energy applied to the heating wire.

More specifically, the temperature of the heating wire (or control wire) is maintained constant independently of the mass of the heating element, die, mold or material being melted, welded, formed or extruded and the thermal conductivities thereof. To maintain the temperature constant, a greater or lesser quantity of RF energy is transmitted to the heating wire via the coaxial cable.

It is a characteristic of ohmic conductors to change electrical conductivity with temperature. The temperature coefficient, $\alpha$, varies with each element type and is, in general, non linear. It may be expressed as $\alpha = 1/\rho \, d\rho/dT$, where $\rho$ is an element of electrical resistivity. It is generally true that over a finite temperature range, linearity can be approximated and the resistance of a load can be expressed as $R = \alpha T$.

Measuring the resistance while applying RF energy may be accomplished with a single wire system by applying a constant current through the coaxial cable while isolating this current from the applied RF signal with a low pass filter. Instead of using a low pass filter, the two signals can be time interleaved or otherwise multiplexed. The voltage at the constant current source is proportional to the load resistance, as expressed in the following equation: $V_o = IR_T = I(R_C + \alpha T) = I(R_C + 1/\rho \, d\rho/dT \, T)$, where $R_C$ represents the DC resistance of the coaxial cable. This voltage change provides a control signal for varying the RF energy output to maintain the voltage, hence temperature, at a preset value. For a two wire system, one wire, a heating wire, receives the transmitted RF energy from the coaxial cable and heats to a temperature dictated by the RF energy received and the amount of heat transmitted to the adjacent heating element. The other wire, a control wire, is heated by the heating element and its resistance will change as a function of its temperature. The constant DC current or relatively low frequency constant AC current is applied to the control wire and the resulting voltage change sensed by a control circuit modifies the RF energy output to maintain the voltage at a preset value (and constant temperature at the heating element).

Referring to FIG. 20a, circuit 600 includes an RF generator 602 for delivering RF energy through conductors 604,606 to conductor 608 and shield 610 of coaxial cable 612, which coaxial cable is connected to the heating wire and ground, respectively. The heating wire to be heated is represented by resistor 614 and designated by the symbol $R_L$. The impedance of the coaxial cable is represented by the symbol Zo. So that various load resistances and various cable impedances may be used, an impedance matching network ensures the delivery of maximum available energy or power. Consequently, an impedance matching network 616 is disposed between RF generator 602 and coaxial cable 612.

A DC current or low frequency AC current is applied to coaxial conductor 608 through conductor 618.

The voltage on conductor 618 will vary as a function of the change is resistance of the load, $R_L$. This change in voltage is applied through conductor 620 to RF generator 602 to vary the output of the RF generator correspondingly. Low pass filter 622 is employed to isolate the temperature sensing signal (voltage from the DC or AC current source) from the RF energy applied to heat the load. An offset and calibration network 624 is employed to zero out the impedance of coaxial cable 612, which impedance remains essentially constant; also, other constant impedance elements, such as lead lines interconnecting the plug of a heating element with the heating wire (and control wire, if used). The circuit also calibrates a change in voltage with the temperature of the load. As depicted, operational amplifiers may be used to perform the functions of offset and calibration.

Figure 20B:
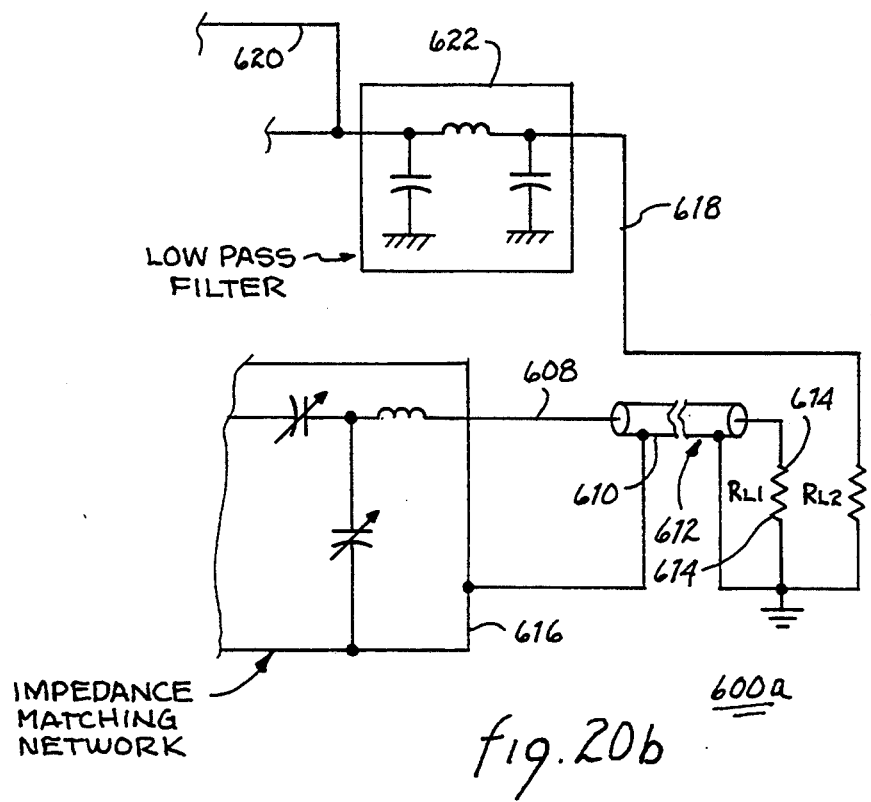

FIG. 20b illustrates circuit 600 modified to provide a two wire system having a heater wire and a control wire. RF energy is provided through conductor 608 to the heater wire ($R_{L1}$) associated with the heating element. A DC current or low frequency AC current is applied to the control wire ($R_{L2}$) thermally coupled with the heating element to provide a varying resistance as a function of the change in temperature of the heating element. The resulting change in voltage is applied through conductor 620 to the RF generator to increase or decrease the amount of RF energy output transmitted to the heating wire ($R_{L1}$).

Figure 21C:
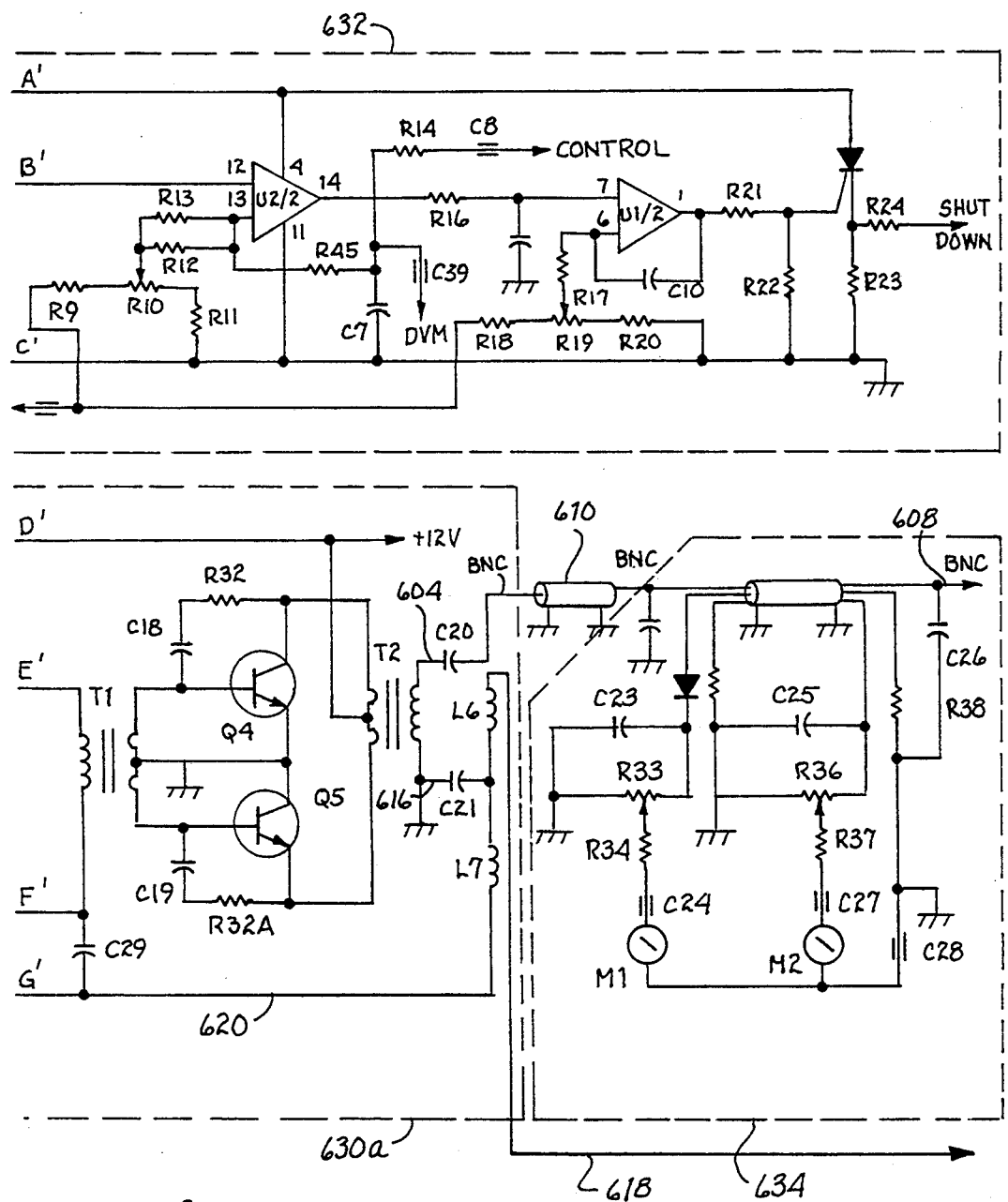
FIG. 21c illustrates a schematic drawing of the circuit shown in FIG. 20b.

Referring to FIGS. 21a and 21b, there are shown component details of circuit 600 illustrated in FIG. 20a. Circuit 600 includes three distinct sections: RF generator 630, monitor and control circuit 632 and reflectometer 634 (impedance matching network). These three circuits are identified by three boxes of dashed lines correspondingly numerically identified. FIG. 21c illustrates circuit 600 as shown in FIG. 21b modified to circuit 600a shown in block form in FIG. 20b to provide a two wire system having a heater wire and a control wire. Low pass filter 622 is disconnected from conductor 608 at the junction between the conductor and inductor $L_7$. Conductor 618 extends from the disconnected end of inductor $L_7$, as shown. Accordingly, the two wire system uses separate conductors 608 and 618 to provide the heating and control functions, respectively.

To assist one skilled in the art of circuit design and interpretation, each of the components are numbered in accordance with the following legend: resistors - R; capacitors - C; inductors - L: diodes - D; Zener diodes and Schottky barrier rectifiers - Z; silicon controlled rectifiers - SCR; crystal -XTL; transistor - Q; coaxial connector - BNC; integrated circuit or operational amplifier - U; transformer - T; reference voltage - Ref: light emitting diode - LED; meter - M; and, digital volt meter - DVM. Details of this circuit are set forth in United States patent application Ser. Nos. 07/337,903, filed Apr. 13, 1989 (now abandoned) and Ser. No. 07/724,107, filed Jul. 1, 1991 (now abandoned), which applications are assigned to the present assignee, and the teachings therein are incorporated herein by reference.

FIG. 22 illustrates a block diagram of a circuit 650 incorporating an RF generator providing high power on the order of 200 watts to a mold for melting, forming, welding or extruding thermoplastic materials, which mold may, for example, be any of the types of molds discussed above. A power supply 656 for providing the requisite DC power at output 658 is illustrated in FIG. 22a. Power input 660 to the DC power supply may be conventional 110 volt 60 cycle AC power or 220 volt 50 cycle AC power. The DC output of the power supply provides the power required by the various components of circuit 650. Circuit 650 is a single wire system for providing RF energy and a constant current DC signal (or low frequency AC signal) along a single conductor to resistive heating element 664 of mold 654. A timer 666 provides an output signal on conductor 668 for a preset time interval to energize RF generator 652. During this time interval, the heating element in the mold is heated by the RF energy to a preset temperature and maintained by the control signal at such temperature as a function of the change in voltage of the control signal sensed by the control circuit formed by low pass filter 670 and calibration amplifier 672. Any change in power required to maintain the voltage/temperature at a preset value will produce a signal on conductor 674. A signal on this conductor will provide an input signal to power regulator 676. The power regulator may be a pulse width modulator to control the duty cycle of the RF generator via conductor 678 and thereby regulate quantity of RF energy generated. On completion of the predetermined time interval, a second signal may be generated by timer 666 which signal is transmitted via conductor 680 to mold 654 to perform a further function. Such further function may be that of cooling the heating element (664) of the mold. In such event, a source of compressed air 682 may be actuated to direct a stream of air or other gas or liquid on or about the heating element and/or the mold to cool it. Additionally, further outputs of timer 666 on conductors 684,686 and 688 may be used to generate additional operations attendant mold 654. For example, a further heating cycle may be initiated at the same or different temperature, a second or third heating element may be energized, a part of the mold may be cooled while another part may be heated, etc.

Constant current source 690 provides a constant current signal through conductor 692 and low pass filter 694 and which signal is injected into heating element 664 via conductor 662. The resulting DC voltage or low frequency AC voltage is detected at node A. This voltage is passed through low pass filter 670 and via conductor 671 to calibration amplifier 672. The main function of the calibration amplifier is to provide a one to one function between the millivolts measured and a temperature value. The temperature value resulting from such correlation is displayed on panel meter 696. A temperature control 698 provides a signal on conductor 699 to vary the modulation of power regulator 676 in correspondence with the temperature to be set. That is, the higher the temperature, the greater the modulating signal that is provided by the power regulator and the greater is the power output of RF generator 652. The purpose of the low pass filters is that of separating the DC or low frequency AC from the 40.68 megahertz RF signal. The steady state current is required to create a resistance measurement function as the value of such resistance changes as a function of the temperature of the resistor.

Calibration amplifier 672 may be commercially available or it is straightforward enough for one skilled in the art to develop a circuit to perform the function required. Panel meter 696 and temperature control 698 are readily commercially available. Timer 666 may be developed to perform the specific functions sought, it may be a micro computer or equivalent units may be commercially available. Similarly, power supply 656 may be any power supply providing the requisite DC voltages to the various components of circuit 650. The circuit of the components within dashed line 700 are set forth in detail in FIG. 23.

Figure 23:
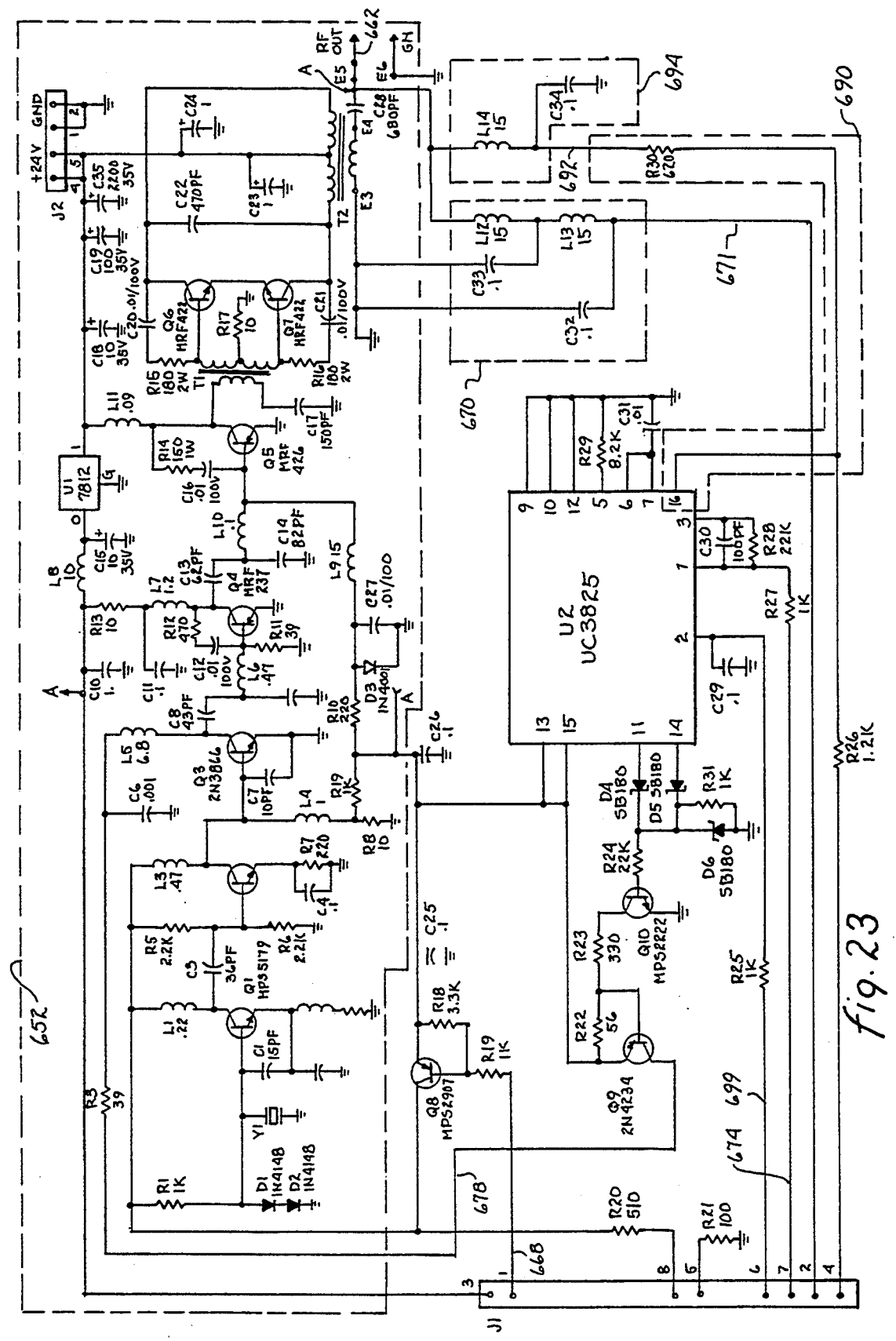
FIG. 23 illustrates a schematic drawing of the circuit shown in FIG. 22.

Referring to FIG. 23, the components enclosed by dashed line 652 comprise the RF generator. Low pass filter 694 is represented by the components within dashed line 694. Similarly, the components comprising low pass filter 670 are disclosed within dashed line 670. The components of current source 690 are set forth within dashed line 690 and include the functions available at pin 16 of integrated circuit UC 3825. The remaining components, in combination with certain functions performed by the integrated circuit (UC 3825) constitute power regulator 676. To further correlate the schematics shown in FIG. 23 with the block diagram shown in FIG. 22, the various interconnecting conductors have been referenced with corresponding reference numerals. A detailed description of the components and operation of the circuit shown in FIG. 23 will not be undertaken since sufficient information is provided to enable one skilled in the art to make and use the circuit.

Figure 24:
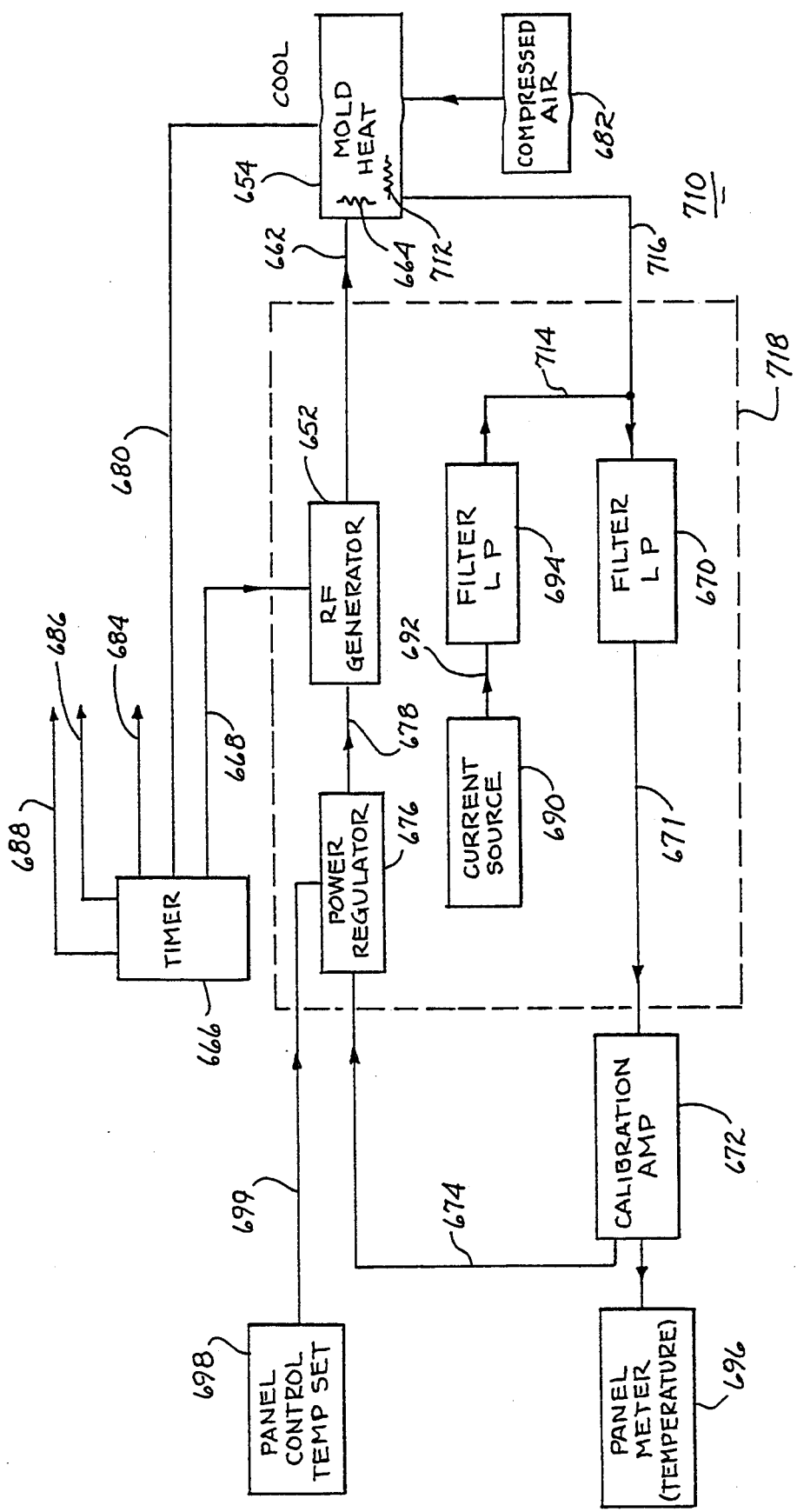
FIG. 24 illustrates a circuit in block diagram form of a high power two wire system for heating and for temperature managing the heating element of a mold.

FIG. 24 is a block diagram very similar to the block diagram shown in FIG. 22 except that FIG. 22 shows a single wire system whereas FIG. 24 illustrates a two wire system. In this embodiment, resistive heating wire 664 of mold 654 performs the single function of heating the mold as a function of the RF energy supplied to it through conductor 662. Preferably, the resistive heating wire has a very low thermal coefficient of resistance such that its resistance remains essentially constant throughout the useful temperature range of the heating element. A control wire 712 is associated with the heating element of the mold such that its temperature will be a function of the temperature of the heating element. Furthermore, the control wire preferably has a high thermal coefficient of resistance such that the value of its resistance will vary substantially as a function of its temperature.

Constant current source 690 provides a constant DC current or low frequency AC current through low pass filter 694 via conductors 714 and 716 to control wire 712. Because the resistance of control wire 712 will vary as a function of the temperature of the heating element, the voltage on conductor 716 will vary correspondingly. This voltage is transmitted to calibration amplifier 672 through low pass filter 670 and conductor 671. Thereafter, the operation of circuit 710 is duplicative of the operation of circuit 650 described above and shown in FIG. 22.

Figure 25:
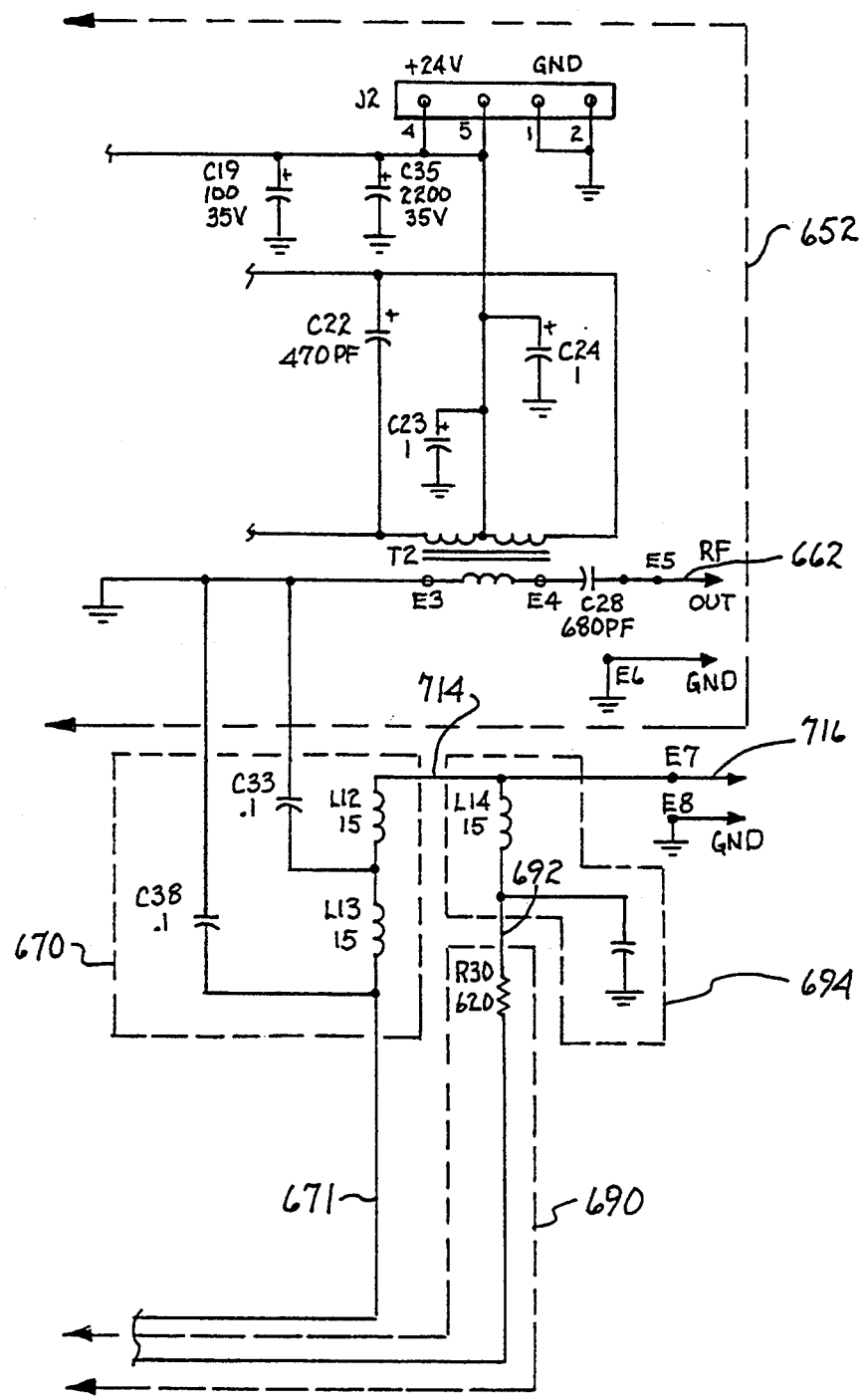
FIG. 25 illustrates a schematic diagram of a modified part of the circuit shown in FIG. 23 to provide the circuit shown in FIG. 24.

The components depicted within dashed line 718 in FIG. 24 are duplicative of those illustrated in FIG. 23 except for the modifications illustrated in FIG. 25. For ease of reference, numerals in FIGS. 23 and 24 will be used in describing and illustrating corresponding elements in FIG. 25. In particular, node A is absent and the control signal is conveyed by conductor 716 interconnecting inductors $L_{12}$ and $L_{14}$ of low pass filters 670 and 694. Thus, the control signal is conveyed to control wire 712, independently of conductor 662 transmitting the RF energy. Accordingly, the circuit illustrated in FIG. 23 can be converted from a single wire system to a two wire system with the modification depicted in FIG. 25.

We claim:

1. Apparatus for melting, forming, welding and extruding heat responsive material, said apparatus comprising in combination:

a) a source of RF energy;
b) means for transmitting RF energy from said source;
c) a mold, including a die, for melting, forming, welding and extruding the heat responsive material;
d) a heating element for heating said die of said mold to melt, form, weld and extrude the heat responsive material, said heating element including means for generating heat in response to the RF energy transmitted by said transmitting means;
e) means for sensing the temperature of said heating element; and
f) means for regulating the RF energy transmitted in response to said sensing means to maintain the temperature of the heating element at a settable temperature.

2. The apparatus as set forth in claim 1 including means for restricting heat transfer from said die throughout said mold.

3. The apparatus as set forth in claim 1 including at least one heat sink for dissipating heat from said mold.

4. The apparatus as set forth in claim 1 including means for dissipating energy from said heating element after the heat responsive material has been melted, formed, welded and extruded.

5. The apparatus as set forth in claim 4 wherein said dissipating means comprises a source of gas under pressure for providing a stream of cooling gas to cool said heating element.

6. The apparatus as set forth in claim 1 including a housing for supporting said mold.

7. The apparatus as set forth in claim 6 wherein said mold includes a heat sink.

8. The apparatus as set forth in claim 7 including means for supporting said heat sink with said housing.

9. The apparatus as set forth in claim 8 wherein said heat sink is a disc and wherein said supporting means includes means for receiving and retaining said disc.

10. The apparatus as set forth in claim 7 wherein said mold includes a further heat sink.

11. The apparatus as set forth in claim 9 wherein said die of said mold is disposed intermediate said heat sink and said further heat sink.

12. The apparatus as set forth in claim 7 including a thermal choke disposed in said mold intermediate said die and said heat sink.

13. The apparatus as set forth in claim 10 including a thermal choke disposed in said mold intermediate said die and said heat sink and a further thermal choke disposed in said mold intermediate said die and said further heat sink.

14. The apparatus as set forth in claim 1 wherein said heating element is disposed about said die of said mold.

15. The apparatus as set forth in claim 1 wherein said heating element includes an element having a high thermal coefficient of resistance.

16. The apparatus as set forth in claim 1 wherein said transmitting means and said sensing means are a common medium.

17. The apparatus as set forth in claim 1 wherein said transmitting means and said sensing means are separate and distinct media.

18. Apparatus for melting, forming, welding and extruding heat responsive material, said apparatus comprising in combination:

a) a mold, said mold including a die and a heat zone commensurate with said die for melting, forming, welding and extruding the heat responsive material;

b) a heating element for providing a source of heat to the heat zone commensurate with said die;

c) means for disengageably engaging said heating element with said mold; and d) means for heating said heating element.

19. The apparatus as set forth in claim 18 wherein said heating element is of high thermal conductivity material.

20. The apparatus as set forth in claim 18 wherein said heating element is of low thermal mass.

21. The apparatus as set forth in claim 18 wherein said heating element if of low thermal inertia.

22. The apparatus as set forth in claim 18 wherein at least a part of said heating element encircles said mold coincident with the heat zone of said die.

23. The apparatus as set forth in claim 22 wherein said heating element is a spool.

24. The apparatus as set forth in claim 18 including thermal choke means for restricting flow of heat from the heat zone.

25. The apparatus as set forth in claim 18 including means for cooling said die on completion of the melting, forming, welding and extruding of the heat responsive material.

26. Apparatus for melting, forming, welding and extruding heat responsive material, said apparatus comprising in combination:

a) a mold, said mold including a die and a heat zone commensurate with said die for melting, forming, welding and extruding the heat responsive material;

b) means for providing heat to the heat zone commensurate with said die;

c) said die including material of high thermal conductivity for transferring heat from said heat providing means to the heat zone; and d) means for restricting heat transfer from the heat zone.

27. The apparatus as set forth in claim 26 wherein said mold includes material of low thermal mass.

28. The apparatus as set forth in claim 26 including a source of electrical energy and wherein said heat providing means includes a conductor thermally responsive to electrical energy from said source for providing a source of heat.

* * * * *